(12) United States Patent
Saito et al.

(10) Patent No.: US 9,102,175 B2
(45) Date of Patent: Aug. 11, 2015

(54) TRANSPORT ROLLER, TRANSPORT UNIT, AND PRINTING APPARATUS

(75) Inventors: Koichi Saito, Matsumoto (JP); Katsunori Ono, Shiojiri (JP); Kenji Ozawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 652 days.

(21) Appl. No.: 12/704,477

(22) Filed: Feb. 11, 2010

(65) Prior Publication Data

US 2010/0209168 A1   Aug. 19, 2010

(30) Foreign Application Priority Data

Feb. 13, 2009   (JP) ................................. 2009-031828

(51) Int. Cl.
| | |
|---|---|
| *B41N 7/00* | (2006.01) |
| *B41J 13/076* | (2006.01) |
| *B21C 37/15* | (2006.01) |
| *B65H 27/00* | (2006.01) |
| *C23C 24/04* | (2006.01) |
| *F16C 13/00* | (2006.01) |

(52) U.S. Cl.
CPC .............. *B41J 13/076* (2013.01); *B21C 37/15* (2013.01); *B65H 27/00* (2013.01); *C23C 24/04* (2013.01); *F16C 13/00* (2013.01); *B41N 7/00* (2013.01); *B41N 2207/02* (2013.01); *B41N 2207/10* (2013.01); *B65H 2401/115* (2013.01); *B65H 2402/80* (2013.01); *B65H 2404/13* (2013.01); *B65H 2404/1351* (2013.01); *B65H 2404/531* (2013.01)

(58) Field of Classification Search
CPC .. B41N 2207/14; B41N 2207/10; B41N 7/00; B65H 2404/135; B65H 2401/115; B41J 13/076

USPC .............. 101/402–404, 216, 217, 375, 376; 193/37; 492/48; 221/42–43
See application file for complete search history.

(56) References Cited

U.S. PATENT DOCUMENTS

| | | | | |
|---|---|---|---|---|
| 4,250,135 | A | * | 2/1981 | Orsini ........................... 264/227 |
| 4,537,127 | A | * | 8/1985 | Fadner et al. ................. 101/141 |
| 4,742,769 | A | * | 5/1988 | Zeller ............................ 101/216 |
| 5,006,400 | A | * | 4/1991 | Pinkston et al. .............. 442/153 |

(Continued)

FOREIGN PATENT DOCUMENTS

| | | |
|---|---|---|
| JP | 2001-063862 A | 3/2001 |
| JP | 3271048 B2 | 4/2002 |

(Continued)

OTHER PUBLICATIONS

M-W Online Dictionary, Definition of "Stride", obtained Aug. 27, 2012.*

*Primary Examiner* — David Banh
(74) *Attorney, Agent, or Firm* — Kilpatrick Townsend & Stockton LLP

(57) ABSTRACT

A transport roller includes: a roller body of which a pair of end surfaces face each other by a press work so as to be in a cylindrical shape; and a high friction layer which contains inorganic particles and is provided on a surface of the roller body. Here, the roller body is provided with a joining portion which is formed by separating the pair of end surfaces. In addition, an average particle diameter of the inorganic particle is larger than a distance between the pair of the end surfaces of the roller body on an outer peripheral surface side thereof.

20 Claims, 20 Drawing Sheets

(56) References Cited

U.S. PATENT DOCUMENTS

| | | | |
|---|---|---|---|
| 5,351,615 A * | 10/1994 | Kobler et al. | 101/217 |
| 5,379,693 A * | 1/1995 | Hoffmann et al. | 101/375 |
| 5,829,354 A * | 11/1998 | Buckley | 101/483 |
| 5,840,386 A * | 11/1998 | Hatch et al. | 428/36.9 |
| 5,845,574 A * | 12/1998 | Dilling et al. | 101/351.6 |
| 5,927,195 A * | 7/1999 | Volz et al. | 101/183 |
| 6,309,512 B1 * | 10/2001 | Bengtsson et al. | 162/358.5 |
| 6,357,354 B1 * | 3/2002 | Dauer et al. | 101/477 |
| 6,539,629 B2 * | 4/2003 | Lai | 29/895.211 |
| 6,540,218 B2 | 4/2003 | Tsukada et al. | |
| 6,619,200 B2 * | 9/2003 | Cacchi | 101/216 |
| 6,769,362 B2 * | 8/2004 | Okubo et al. | 101/375 |
| 6,782,820 B1 * | 8/2004 | Okubo et al. | 101/375 |
| 6,899,029 B2 * | 5/2005 | Invernizzi | 101/376 |
| 7,131,375 B2 * | 11/2006 | Byers et al. | 101/217 |
| 7,270,873 B2 * | 9/2007 | Rizika et al. | 428/316.6 |
| 7,412,924 B2 * | 8/2008 | Kummet et al. | 101/217 |
| 7,610,938 B2 | 11/2009 | Yanokura et al. | |
| 7,861,652 B2 * | 1/2011 | Metrope | 101/375 |
| 8,047,134 B2 * | 11/2011 | Hoffmann et al. | 101/376 |
| 2002/0002921 A1 * | 1/2002 | Hoffmann et al. | 101/376 |
| 2002/0134264 A1 * | 9/2002 | Okubo et al. | 101/401.1 |
| 2003/0075062 A1 * | 4/2003 | Grieser | 101/375 |
| 2004/0253024 A1 * | 12/2004 | Longhenry et al. | 399/266 |
| 2005/0106968 A1 * | 5/2005 | Rizika et al. | 442/110 |
| 2005/0241503 A1 * | 11/2005 | Hoffmann et al. | 101/217 |
| 2005/0252397 A1 * | 11/2005 | Byers et al. | 101/217 |
| 2006/0042489 A1 * | 3/2006 | Kummet | 101/376 |
| 2006/0124006 A1 * | 6/2006 | Fullgraf et al. | 101/376 |
| 2007/0044671 A1 * | 3/2007 | Knabe | 101/246 |
| 2007/0070113 A1 * | 3/2007 | Kawabata et al. | 347/20 |
| 2007/0089622 A1 * | 4/2007 | Toyoda et al. | 101/375 |
| 2007/0209538 A1 * | 9/2007 | Grieser et al. | 101/376 |
| 2008/0034998 A1 * | 2/2008 | Byers et al. | 101/376 |
| 2008/0041249 A1 * | 2/2008 | D'Hauwe | 101/217 |
| 2008/0041254 A1 * | 2/2008 | Metrope | 101/375 |
| 2008/0041255 A1 * | 2/2008 | Andrew | 101/376 |
| 2009/0033022 A1 | 2/2009 | Iki et al. | |
| 2009/0095180 A1 * | 4/2009 | Hoffmann et al. | 101/376 |
| 2009/0139418 A1 * | 6/2009 | Akiyama | 101/375 |

FOREIGN PATENT DOCUMENTS

| | | |
|---|---|---|
| JP | 2006-289496 A | 10/2006 |
| JP | 2007-025196 A | 2/2007 |
| WO | 2004/007324 A1 | 1/2004 |

* cited by examiner

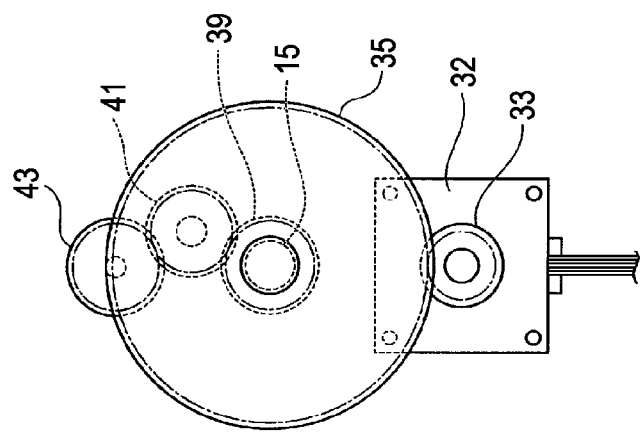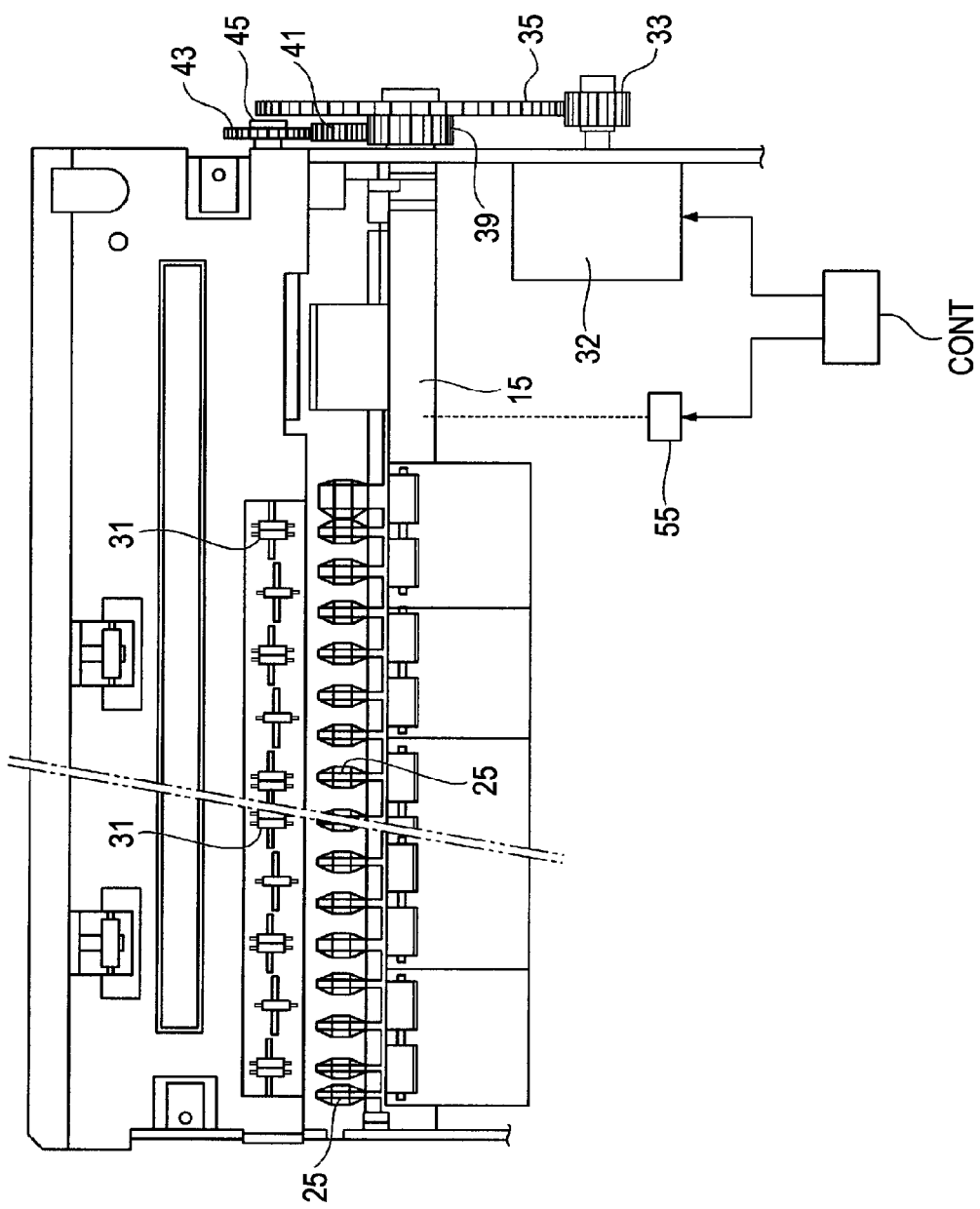

TRANSPORT ROLLER, TRANSPORT UNIT, AND PRINTING APPARATUS

CROSS-REFERENCE TO RELATED APPLICATIONS

This application claims the benefit of priority to Japanese Patent Application No. 2009-031828 filed Feb. 13, 2009, the contents of which are hereby incorporated by reference in their entirety.

BACKGROUND

1. Technical Field

The present invention relates to a transport roller, a transport unit, and a printing apparatus.

2. Related Art

In the past, various printers have been provided as printing apparatuses. These printers are configured such that recording media such as paper are transported to a printing unit by a transport roller (paper feeding roller) and a driven roller, and after printing is performed, the media are discharged by the discharge roller (driving roller) and the driven roller (GIZA roller).

In such a printer, the transport roller rotates in a state where the paper is interposed between the transport roller and the driven roller, so that the paper is moved in a sub scanning direction perpendicular to a moving direction of a carriage. Since the paper must be transported to the recording position with high accuracy and be sequentially fed in synchronization with the printing speed, a high transportation force is required.

In order that the transport roller has a high frictional force, Japanese Patent No. 3271048 discloses a technique in that a large number of protrusions are formed on a circumferential surface of a metallic round bar by an embossing work.

In the technique, there is a problem that workability is very poor at forming the protrusions on the shaft-like (cylindrical) surface along the circumferential direction. In addition, since a solid material is used, the cost is also increased.

In view of the above situation, JP-A-2006-289496 discloses with the aim of cost reduction, in that a metal plate is subjected to a bending work to form a shaft (cylindrical shaft) in a cylindrical shape (hollow shape) and the cylindrical shaft is used instead of the solid metallic round bar member.

However, when the cylindrical shaft as disclosed in JP-A-2006-289496 is used as the transport roller in order to achieve cost reduction and weight reduction, it is difficult to make the cylindrical shaft have a high frictional force.

For example, it may be considered that the surface is beaten by a pressing work to form protrusions as in the case disclosed in Japanese Patent No. 3271048. However, in this case, since the shaft is hollow, it is easily deformed. In addition, a joining portion which is formed when the bending work is carried out is open.

As described above, when the joining portion is open, a minute groove caused by the joining portion is formed in the transport roller to be obtained. When the paper (recording medium) comes into contact with the groove at the time of feeding the paper, the contact resistance differs from that when the paper comes into contact with other surfaces. As a result, the transport speed is changed which acts as one factor causing uneven transportation. In addition, a so-called ink jet printer, which forms images by ejecting fine droplets, necessitates very high accuracy in feeding paper. Therefore, in particular, the occurrence of uneven transportation caused by the groove becomes problematic.

SUMMARY

An advantage of some aspects of the invention is to provide a transport roller which offers excellent cost reduction and weight reduction and in which uneven transportation is also prevented, a transport unit and a printing apparatus which use the transport roller.

According to an aspect of the invention, there is provided a transport roller which includes: a roller body of which a pair of end surfaces face each other by a press work so as to be in a cylindrical shape; and a high friction layer which contains inorganic particles and is provided on a surface of the roller body. Here, the roller body is provided with a joining portion which is formed by separating the pair of end surfaces. In addition, the average particle diameter of the inorganic particles is larger than a distance between the pair of the end surfaces of the roller body on the outer peripheral surface side thereof.

According to the transport roller, by using the roller body which is formed by the press work so as to be in a cylindrical shape, the cost and the weight can be reduced compared with the case where a round bar made of a solid material is used. In addition, since the high friction layer containing the inorganic particles is provided on the surface of the roller body, a transportation force is favorably exhibited by the high friction layer.

In addition, the average particle diameter of the inorganic particle is larger than the distance (that is, the width on the outer peripheral surface side) between the pair of the end surfaces of the joining portion of the roller body on the outer peripheral surface side thereof. Thus, when the inorganic particles are mixed so as to form the high friction layer on the surface of the roller body, the joining portion is covered by the inorganic particles, so that the groove caused by the joining portion is not formed. Therefore, since the groove caused by the joining portion described above is removed, uneven transportation caused by the groove is prevented.

In the transport roller, the distance between the pair of the end surfaces in the joining portion is narrow on an inner peripheral surface side of the roller body compared with the outer peripheral surface side thereof. In addition, the high friction layer includes inorganic particles of which a size is larger than a distance between the pair of the end surfaces on the outer peripheral surface side of the roller body and smaller than a distance between the pair of the end surfaces on the inner peripheral surface side of the roller body.

According to such a configuration, when the inorganic particles are mixed so as to form the high friction layer on the surface of the roller body, a part of the inorganic particles enters in the gap formed in the joining portion. Therefore, the groove caused by the joining portion is surely not formed. In addition, even though the external force is added to a direction to narrow the gap of the joining portion in use, the inorganic particles entered in the gap stand against the force. Therefore, the deformation of the roller body is surely suppressed. Accordingly, uneven transportation caused by the deformation is also prevented.

In the transport roller, a minimum particle diameter of the inorganic particles is larger than the shortest distance between the pair of the end surfaces of the joining portion.

According to such a configuration, when the inorganic particles are mixed so as to form the high friction layer on the surface of the roller body, the inorganic particles do not pass through the gap formed in the joining portion so as not to enter the roller body. Therefore, subsequently, a process for cleaning the inside of the roller body is alleviated.

In the transport roller, the inorganic particles may be aluminum oxide.

Since aluminum oxide ($Al_2O_3$) has relative high hardness, a favorable function of increasing frictional resistance is exhibited. In addition, aluminum oxide is relatively reduced in cost, so that the cost reduction is not hindered.

In the transport roller, the high friction layer may be formed by dispersing the inorganic particles in resin.

According to such a configuration, even being used for a long time, the inorganic particles are stably held on to the surface of the roller body, so that transportation performance is reliably secured for a long time.

In the transport roller, the high friction layer may be provided on the center portion excepting both ends of the roller body.

In general, both ends of the roller body are a part for attaching a connection element of the driving system such as a toothed wheel. The center portion of the roller body comes into direct contact with a recording medium such as paper. Therefore, by providing the high friction layer only on the center portion coming into direct contact with the recording medium, the cost of the material for the high friction layer is kept to a minimum.

According to another aspect of the invention, there is provided a transport unit which is provided with the above-mentioned transport roller.

According to the transport unit, there is provided a transport roller which can be reduced in cost and weight and favorably exhibit a good transportation force, and in which uneven transportation caused by the joining portion of the roller body is prevented. Therefore, the transport unit itself can be reduced in cost and weight, and furthermore the transportability of the recording medium by the transport roller is also excellent.

In addition, the transport unit may be further provided with a driven roller which is driven as the transport roller is rotated, and a low-abrasion treatment may be implemented on the surface of the driven roller.

According to such a configuration, by coming into contact with the transport roller, and particularly to the high friction layer, it is possible to suppress damage on the driven roller.

In the transport unit, the driven roller may be disposed in a position coming into contact with the high friction layer of the transport roller.

According to such a configuration, a force for interposing a recording medium such as paper is increased between the transport roller and the driven roller, and the transportation performance of the recording medium is more favorable.

According to still another aspect of the invention, there is provided a printing apparatus which is provided with the transport roller, a print unit which carries out a print process on a recording medium which is transported by the transport roller.

According to the printing apparatus, since the transport unit is provided, the cost and the weight can be reduced, and furthermore the printing apparatus is excellent in transporting the recording medium.

BRIEF DESCRIPTION OF THE DRAWINGS

The invention will be described with reference to the accompanying drawings, wherein like numbers reference like elements.

FIG. 2A is a plan view illustrating a transport unit.

FIG. 2B is a side view illustrating a driving system of a transport unit.

DESCRIPTION OF EXEMPLARY EMBODIMENTS

Figure 1:
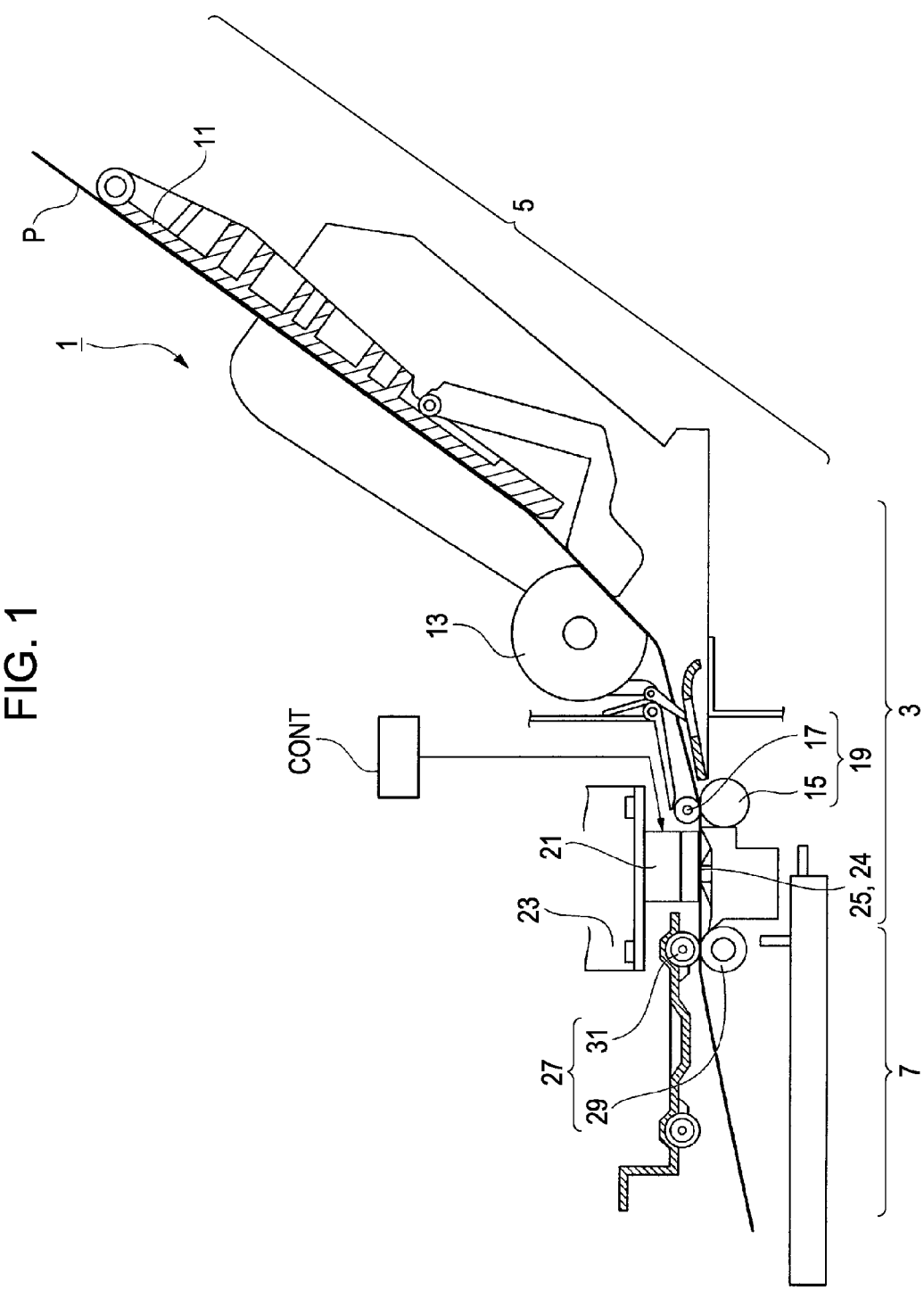
FIG. 1 is a sectional side view illustrating an ink jet printer according to the invention.

In the following, the invention will be described in detail with reference to the drawings. Further, scales of the respective components are appropriately modified from actual so as to recognize the components in the drawings for explanation.

First, the printing apparatus provided with the transport roller according to the invention will be described with reference to FIGS. 1 and 2. Further, FIG. 1 is a sectional side view illustrating the printing apparatus (ink jet printer) which is provided with the transport unit according to the invention. FIG. 2A is a plan view illustrating the transport unit of the same printing apparatus. FIG. 2B is a side view illustrating a driving system of the same printing apparatus.

In FIG. 1, the reference numeral 1 denotes the ink jet printer which is the printing apparatus according to an embodiment of the invention. The ink jet printer 1 is configured to include a printer body 3, a paper feeding unit 5 which is provided above the rear side of the printer body 3, and a paper discharge unit 7 which is formed on the front of the printer body 3.

A paper feeding tray 11 is provided on the paper feeding unit 5, and plural pieces of paper (recording media) P are loaded on the paper feeding tray 11. Here, as the paper P, plain paper, coated paper, OHP (over head projector) sheet, glossy paper, glossy films and the like can be used. A paper feeding roller 13 is provided on the downstream side of the paper feeding tray 11. The paper feeding roller 13 pinches the paper P which is positioned on the uppermost portion of the paper feeding tray 11 between separate pads (not shown) facing each other so as to send the paper forward.

The sent paper P reaches a transport roller mechanism 19 which is constituted by a transport roller 15 disposed on the lower side and a driven roller 17 disposed on the upper side. The transport roller 15 corresponds to the transport roller according to the embodiment of the invention as described later. In addition, the transport unit according to the embodiment of the invention is constituted by the transport roller 15, the driven roller 17, and a driving apparatus which drives the transport roller 15.

While being subjected to an accurate and correct transporting (paper feeding) operation by rotational driving of the transport roller 15 in accordance with the print process, the paper P reached to the transport roller mechanism 19 is transported to a print head (print unit) 21 which is positioned on the downstream side of the transport roller mechanism 19.

The print head 21 is held on to a carriage 23. The carriage 23 is configured to reciprocally move in a direction perpendicular to a paper feeding direction (transport direction of the paper P). A platen 24 is disposed on the position facing the print head 21. The platen 24 is constituted by plural diamond ribs 25 which are disposed along a moving direction of the carriage 23 with gaps therebetween. The diamond ribs 25 serve to support the paper P from the lower side when the print head 21 carries out printing on the paper P. Specifically, the top surfaces of the diamond ribs 25 serve as the support surface.

Further, the print process (print job) carried out by the print head 21 is controlled by a control unit CONT.

The distance between the print head 21 and the diamond ribs 25 can be adjusted according to the thickness of the paper P. Therefore, while smoothly passing through the top surfaces of the diamond ribs 25, the paper P is subjected to the printing with the high quality. The paper P printed by the print head 21 is sequentially discharged by a paper discharge roller 27 which is provided on the paper discharge unit 7.

The paper discharge roller mechanism 27 is configured to include a paper discharge roller 29 disposed on the lower side and a paper discharge GIZA roller 31 disposed on the upper side. Therefore, the paper P is withdrawn by the rotational driving of the paper discharge roller 29 so as to be discharged.

Here, in the transport roller mechanism 19 and the paper discharge roller mechanism 27, the transport roller 15, the driving system of the paper discharge roller 29, and the relationship between driving speeds of both the rollers 15 and 29 will be described.

As shown in FIGS. 2A and 2B, a transport motor (driving apparatus) 32 is provided in the printer body 3, which is driven under control of the control unit CONT. A pinion 33 is provided on the driving shaft of the transport motor 32. A transport driving gear 35 is meshed with the pinion 33. The transport roller 15 is inserted into and connected to the transport driving gear 35. With such a configuration as described above, the transport motor 32 becomes the driving apparatus for rotational driving the transport roller 15.

In addition, in the transport roller 15, an inner gear 39 is provided on the same shaft as that of the transport driving gear 35. A medium gear 41 is meshed with the inner gear 39. A paper discharge driving gear 43 is meshed with the medium gear 41. The rotation shaft of the paper discharge driving gear 43 becomes a shaft body 45 of the paper discharge roller 29 as shown in FIG. 2A. With such a configuration, the transport roller 15 of the transport roller mechanism 19 and the paper discharge roller 29 of the paper discharge roller mechanism 27 receive a rotational driving force from the transport motor 32 which is only one driving source so as to be rotated.

Further, the rotation speed of the paper discharge roller 29 is set to be higher than the rotation speed of the transport roller 15 by adjusting gear ratios between the respective gears. Therefore, the paper discharge speed of the paper discharge roller mechanism 27 increases by an acceleration rate s by the transport speed of the transport roller mechanism 19.

In addition, an interposing force (pressing force) of the paper P generated by the transport roller mechanism 19 is set to be higher than the interposing force (pressing force) generated by the paper discharge roller mechanism 27. Therefore, when the paper P is interposed by both the transport roller mechanism 19 and the paper discharge roller mechanism 27 at the same time, the transport speed of the paper has nothing to do with the paper discharge speed of the paper discharge roller mechanism 27, but is defined by the transport speed of the transport roller mechanism 19.

Next, the transport roller mechanism 19 which is provided with the transport roller 15 according to the invention will be described.

Figure 3:
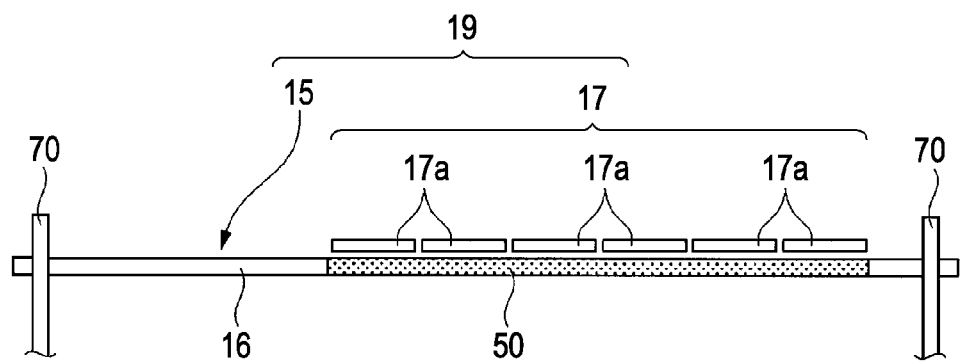
FIG. 3 is a diagram illustrating a configuration of a transport roller.

FIG. 3 shows a schematic configuration of the transport roller mechanism 19 which is constituted by the transport roller 15 and the driven roller 17.

The transport roller 15 is provided with a roller body 16 which is formed such that a metal plate such as a zinc-coated steel plate and a stainless steel plate is subjected to a press work so as to be formed in a cylindrical shape, and a high friction layer 50 which is formed on a surface of the roller body 16.

In addition, the transport roller 15 is configured such that both ends thereof are held on to a bearing 70. In particular, in the end to which the inner gear 39 or the transport driving gear 35 is connected, an engaging section (not shown) is formed so as to be rotatably connected to the inner gear 39 or the transport driving gear 35. Further, on the transport roller 15, various kinds of engaging sections can be formed as described later so as to be connected to various connection elements. In addition, the high friction layer 50 is selectively formed on the center portion excepting both ends of the roller body 16 in this example.

Since being configured such that plural (for example, 6 pieces) rollers 17a are arranged on the same shaft, the driven roller 17 is disposed in a position which faces the high friction layer 50 of the transport roller 15 and comes into contact with the high friction layer 50. A biasing spring (not shown) is mounted on the driven roller 17 which is constituted by the rollers 17a, and the biasing spring urges the driven roller 17 to the transport roller 15. Therefore, the driven roller 17 comes into contact with the high friction layer 50 of the transport roller 15 by a predetermined pressing force (the interposing force with respect to the paper P). Therefore, the driven roller 17 is rotatably driven as the rotational operation of the transport roller 15. In addition, the force to interpose the paper P between the transport roller 15 and the driven roller 17 becomes larger, so that transportability of the paper P is favorable. Further, the surfaces of the respective roller 17a of the driven roller 17 is subjected to a low-abrasion treatment, for example, fluororesin coating, in order to alleviate damage caused by slidable contact with the high friction layer 50.

In addition, the roller body 16 is formed such that a metal plate is subjected to a press work so as to close a pair of end surfaces facing each other, and thus the roller body 16 is formed in a cylindrical shape. Therefore, the pair of end surfaces of the roller body 16 is slightly separated, and a joining portion is formed between the end surfaces.

Here, as the detailed description of the transport roller 15, the manufacturing method thereof will be described.

Figure 4A:
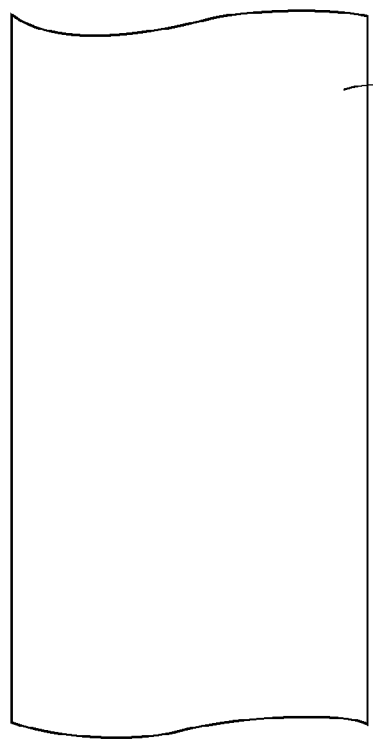
FIG. 4A is a plan view illustrating a metal plate as a base material of a roller body.
Figure 4B:
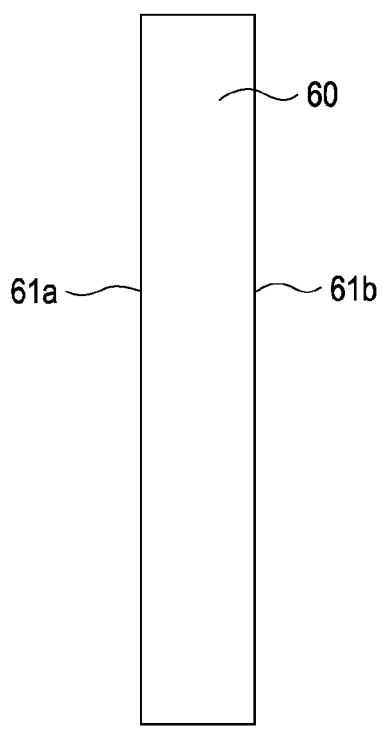
FIG. 4B is a plan view illustrating a metal plate as a base material of a roller body.

In order to manufacture the transport roller 15, first, a large-scale metal plate (first metal plate) 65 in a rectangular plate shape or a stripe shape as shown in FIG. 4A is prepared. As the large-scale metal plate 65, a zinc-coated steel plate with a thickness of about 1 mm is prepared, for example. Then, as shown in FIG. 4B, the large-scale metal plate 65 is subjected to a press work, so that a metal plate (second metal plate) 60 in a thin and long rectangular plate shape with a size corresponding to the roller body 16, that is, the metal plate 60 is formed as a base material of the roller body 16.

Next, the metal plate 60 is subjected to the press work to be in a cylindrical shape (pipe shape) as shown in the process view of the press work in FIGS. 5A to 5C and FIGS. 6A to 6C, and then the end surfaces 61a and 61b of both the end sides (long sides) are formed close to each other.

Figure 5A:
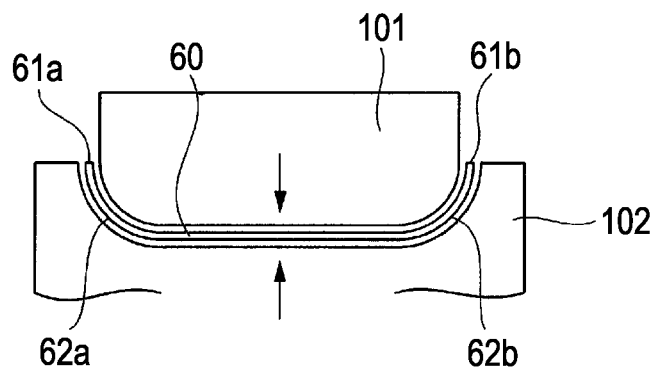
FIG. 5A is a process view illustrating a press work of a metal plate.

That is, first, the metal plate 60 is subjected to the press work by a male die 101 and a female die 102 shown in FIG. 5A, and both the sides 62a and 62b of the metal plate 60 are bent into an arcuate shape (preferably, ¼ arc). Further, in FIG. 5A, in order to easily recognize the respective members, the metal plate 60, the male die 101, and the female die 102 are illustrated with gaps therebetween. In fact, the gaps are not provided, and the metal plate 60 substantially comes into tight contact with the male die 101 and the female die 102. The contact is also the same in FIGS. 5B and 5C and FIGS. 6A to 6C.

Subsequently, the center portion of the metal plate 60 obtained in FIG. 5A in a width direction (bending direction) is subjected to the press work by a male die 103 and a female die 104 shown in FIG. 5B so as to be bent in an arcuate shape (preferably, ¼ arc).

Figure 5B:
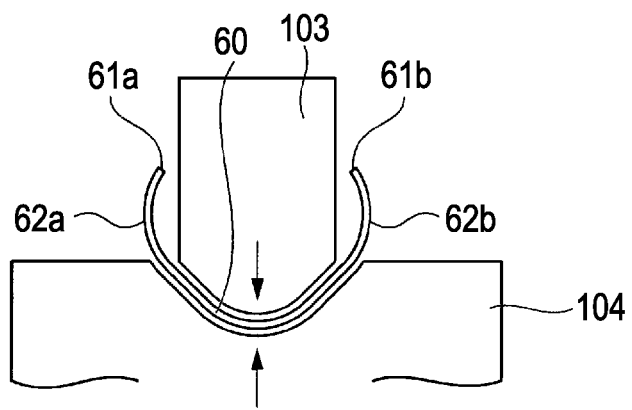
FIG. 5B is a process view illustrating a press work of a metal plate.
Figure 5C:
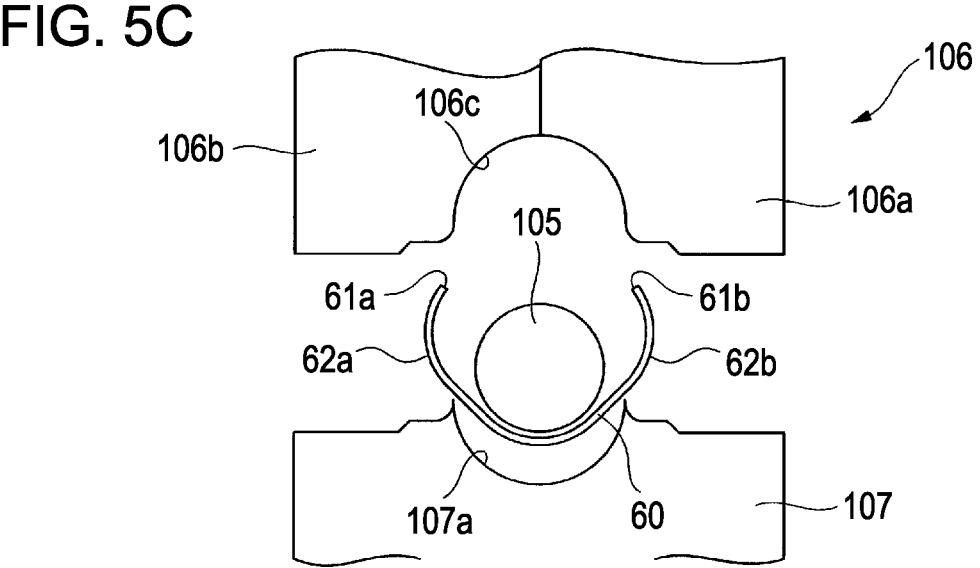
FIG. 5C is a process view illustrating a press work of a metal plate.

Next, as shown in FIG. 5C, a core die 105 is disposed in the metal plate 60 obtained in FIG. 5B. Using an upper die 106 and a lower die 107 shown in FIG. 5C, the respective end surfaces 61a and 61b of both the sides 62a and 62b of the metal plate 60 are formed close to each other as shown in FIGS. 6A to 6C.

Figure 6A:
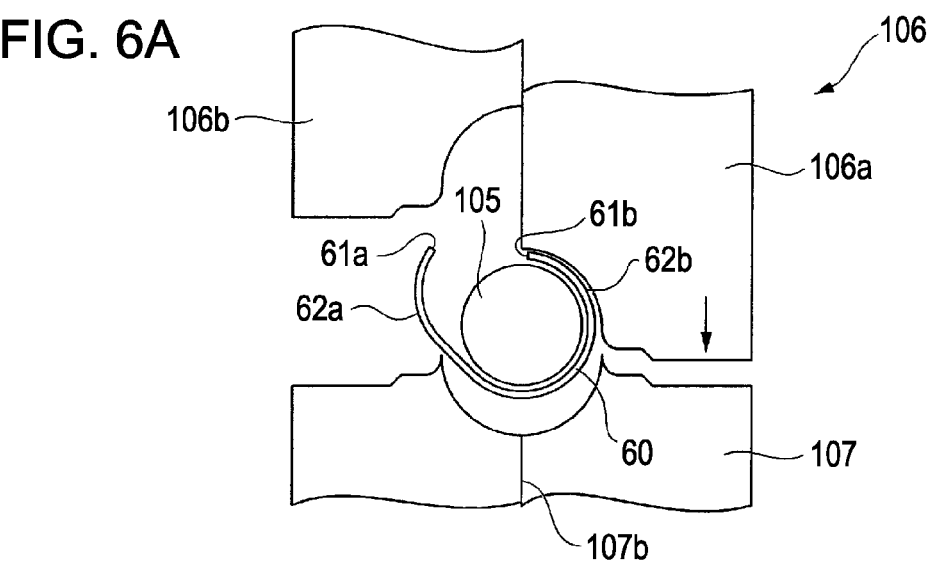
FIG. 6A is a process view illustrating a press work of a metal plate.
Figure 6B:
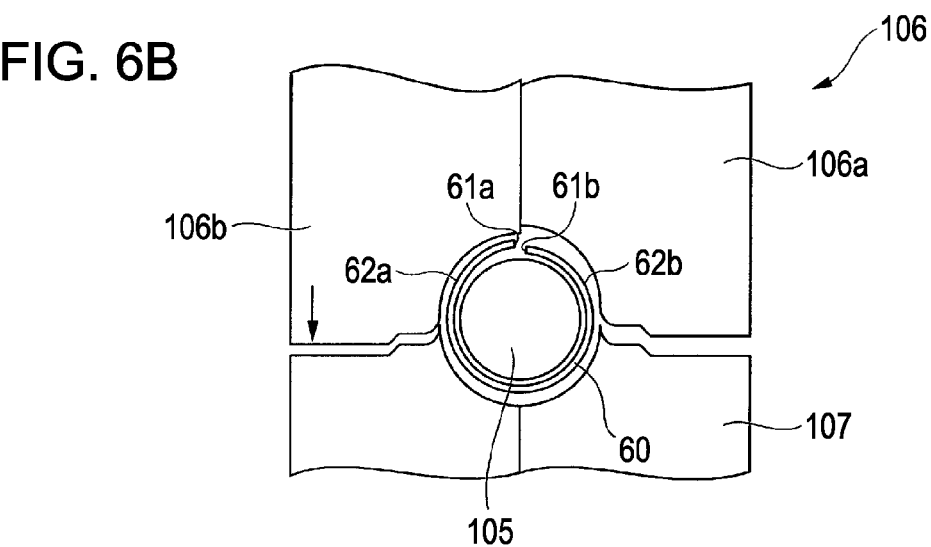
FIG. 6B is a process view illustrating a press work of a metal plate.
Figure 6C:
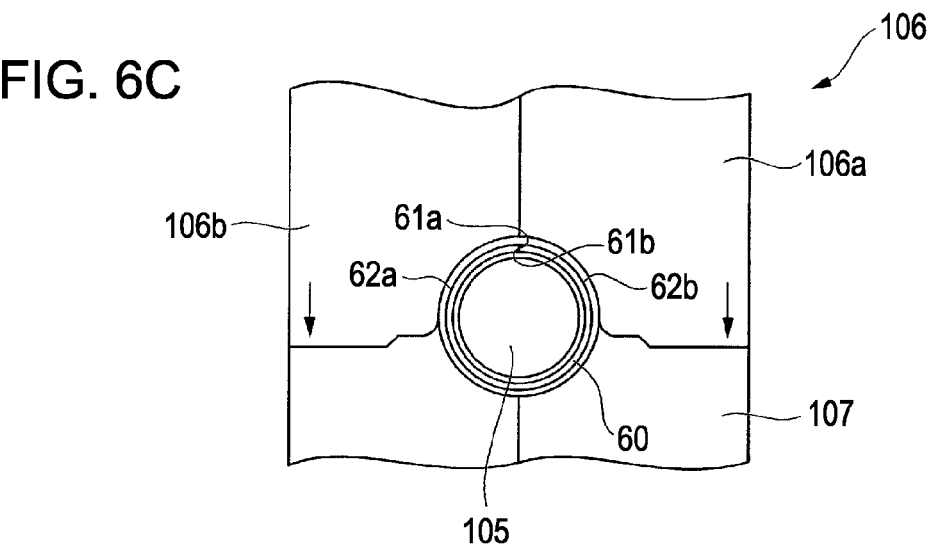
FIG. 6C is a process view illustrating a press work of a metal plate.

Here, the external diameter of the core die 105 shown in FIG. 5C and FIGS. 6A to 6C is equal to the internal diameter of the cylindrical hollow pipe to be formed. In addition, the radius of a press surface 106c of the upper die 106 and the radius of a press surface 107a of the lower die 107 are equal to the radius of the external diameter of the hollow pipe to be formed, respectively. In addition, as shown in FIGS. 6A to 6C, the upper die 106 is configured to include a pair of left and right split dies. The split dies 106a and 106b are configured to separately move in the vertical direction.

That is, from the state shown in FIG. 5C, the right upper die 106a relatively goes down with respect to the lower die 107 (similarly, in the following, the movement of the die means relative movement) as shown in FIG. 6A, one side of the metal plate 60 is subjected to the press work so as to be bent in a substantial semicircular shape. Further, the lower die 107 is also configured to include a pair of left and right split dies similar to the upper die 106 (see the split surface 107b). In the process shown in FIG. 6A, the lower die disposed on the same side may go up.

Next, as shown in FIG. 6B, the core die 106 slightly goes down (to a degree that one end surface 61a and the other end surface 61b can be formed close to each other). In addition, the upper die 106b on the other side goes down, so that the other side of the metal plate 60 is subjected to the press work so as to be bent in a substantially circular shape.

Then, as shown in FIG. 6C, the core die 105 and the pair of the upper dies 106a and 106b go down at the same time so as to form the cylindrical hollow pipe (roller body 16). In this state, both the left and right end surfaces 61a and 61b are in a state of being sufficiently close to each other via a slight gap. That is, in the cylindrical hollow pipe, both the end surfaces 61a and 61b of the metal plate 60 as the base material are close to each other, so that a joining portion is formed between both the end surfaces 61a and 61b. Therefore, both the end surfaces 61a and 61b are separated from each other, so that the joining portion is formed with a gap.

Next, in this embodiment, in order to increase roundness of the formed hollow pipe (roller body 16) and to decrease deflection, the centerless grinding process known in the related art is carried out, so that the outer peripheral surface of the hollow pipe (roller body 16) is ground.

Figure 7A:
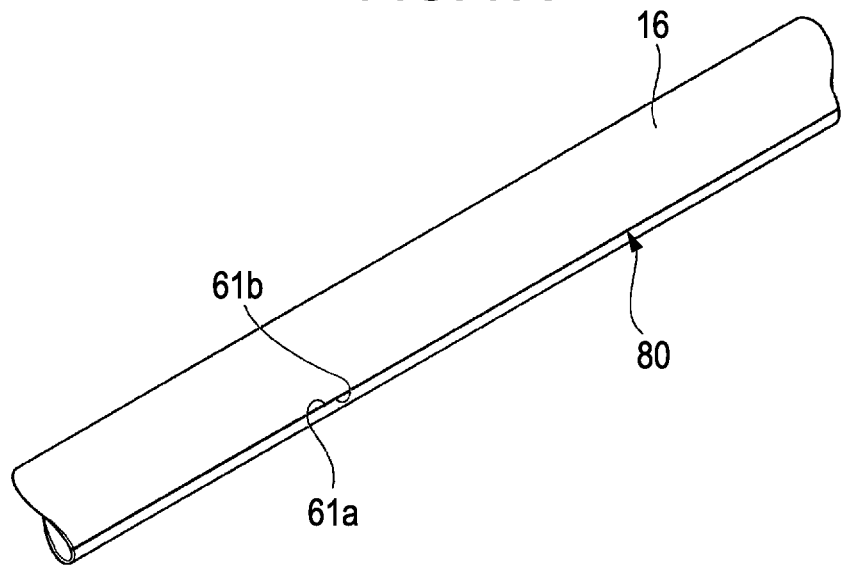
FIG. 7A is a perspective view illustrating a roller body.

Then, the hollow pipe forms the roller body 16 of which the roundness is favorable compared with that before the centerless grinding process is carried out, and the deflection amount is also decreased. In addition, in the roller body 16, both the end surfaces 61a and 61b is more narrowed, so that the joining portion 80 is formed in which the gap between both the end surfaces 61a and 61b is more narrowed as shown in FIG. 7A.

Further, in the press work or the centerless grinding process, it is preferable that the gap between both the end surfaces 61a and 61b of the metal plate 60 is removed, that is, both the end surfaces 61a and 61b come into contact with each other. However, it is very difficult that while the roundness or the deflection amount of the obtained hollow pipe (roller body 16) is maintained, the gap is removed. Therefore, in this state, a gap is formed to some degree.

Figure 7B:
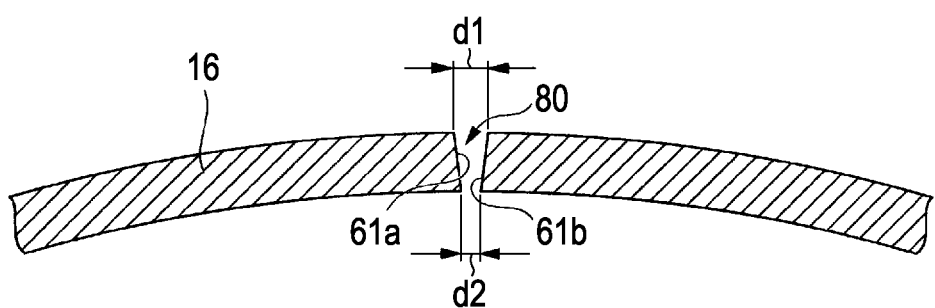
FIG. 7B is a sectional side view illustrating a joining portion.

In the joining portion 80, the outer peripheral surface and the inner peripheral surface of the metal plate 60 are formed with the same dimension (width). Therefore, as shown in FIG. 7B, the distance between the pair of the end surfaces 61a and 61b is relatively widen on the outer peripheral surface side of the roller body 16, and is relatively narrowed on the inner peripheral surface side thereof. That is, between the pair of the end surfaces 61a and 61b, the distance d1 on the outer peripheral surface side of the roller body 16 is large compared with the distance d2 on the inner peripheral surface side thereof. Specifically, in this embodiment, the distance d1 on the outer peripheral surface side becomes 30 μm, and the distance d2 on the inner surface side becomes 10 μm.

After the roller body 16 is formed as described above, the high friction layer 50 is formed on the surface of the roller body 16 as shown in FIG. 3.

As a method of forming the high friction layer 50, a dry method and a wet method (or a method using the two methods jointly) can be employed. In this embodiment, the dry method is suitably employed.

Specifically, first, as materials for forming the high friction layer 50, resin particles and inorganic particles are prepared. As the resin particles, fine particles which are composed of epoxy adhesive, polyester resin or the like with a diameter of about 10 μm are suitably used.

In addition, as the inorganic particles, ceramics particles are suitably used such as aluminum oxide (alumina; $Al_2O_3$), silicon chloride (SiO), silicon dioxide ($SiO_2$) or the like. Among these, alumina is most suitable as it has relatively high hardness, exhibits the favorable function of increasing frictional resistance, and is relatively low in cost so not to hinder cost reduction. Therefore, in this embodiment, the alumina particles are used as the inorganic particles. The alumina particles are adjusted to be a predetermined particle diameter distribution by a polishing treatment. By manufacturing by the polishing treatment, the ends of the alumina particles are formed to be relatively sharp and pointed, and by the sharply-pointed ends, a high coefficient of friction can be exhibited.

In this embodiment, the alumina particles have a particle diameter ranging from 15 μm to 90 μm and adjusted to have a weighted-average particle diameter (average particle diameter) which is a central diameter of 45 μm. That is, in the invention, the average particle diameter (central diameter) of the alumina particle (inorganic particle) is larger than the distance d1 (30 μm) on the outer peripheral surface side of the joining portion 80. In particular, regarding the particle diameter distribution (particle size range), it is preferable that particles are included which are of a size smaller than the distance d1 on the outer peripheral surface side of the joining portion 80 and larger than the distance d2 (10 μm) on the inner peripheral surface side thereof. In addition, it is preferable that minimum particle diameter in the particle diameter distribution is larger than the shortest distance between the pair of the end surfaces 61a and 61b of the joining portion 80, that is, the distance d2 on the inner peripheral surface side thereof.

After the resin particles and the inorganic particles are prepared, first, the resin particles are coated on the roller body 16. That is, the roller body 16 is placed in a paint booth (not shown), and the roller body 16 is charged with, for example, a negative potential in a state where the roller body 16 is a single body.

Then, the resin particles are sprayed (ejected) toward and coat the roller body 16 using a tribo-charging gun of electrostatic equipment (not shown). In addition, the sprayed particles (resin particles) are charged with a high positive potential. Then, the charged resin particles are adsorbed on the outer peripheral surface of the roller body 16 so as to form a resin film.

Figure 8A:
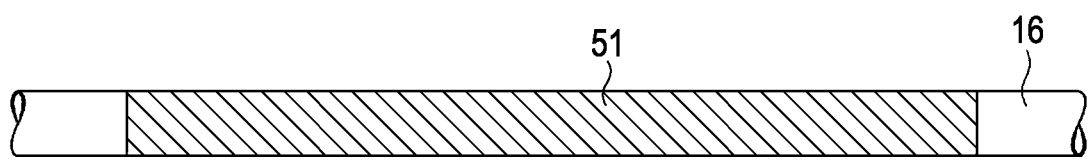
FIG. 8A is a diagram illustrating a formation process of a high friction layer on a roller body.

Here, the resin film formed by coating the resin particles is associated to a formed region of the high friction layer 50 shown in FIG. 3, and not to be formed over the entire length of the roller body 16. For example, both ends of the roller body 16 are masked by a tape or the like. Then, as shown in FIG. 8A, the resin particles are coated only on the center portion excepting both ends thereof. That is, the resin film 51 is selectively formed only on the center portion of the roller body 16. Weak static electricity of about +0.5 KV remains on the resin film 51 after the spray-coating. Further, when the spray-coating is carried out, the roller body 16 is rotated around the shaft so as to form the resin film 51 with a uniform thickness over the entire peripheral surface thereof. The thickness of the resin film 51 is formed to be about, for example, 10 μm to 30 μm in consideration of the particle diameter of the above-mentioned alumina particles. The film thickness can be properly adjusted by the ejected amount and ejected time period of the resin particles.

Figure 9:
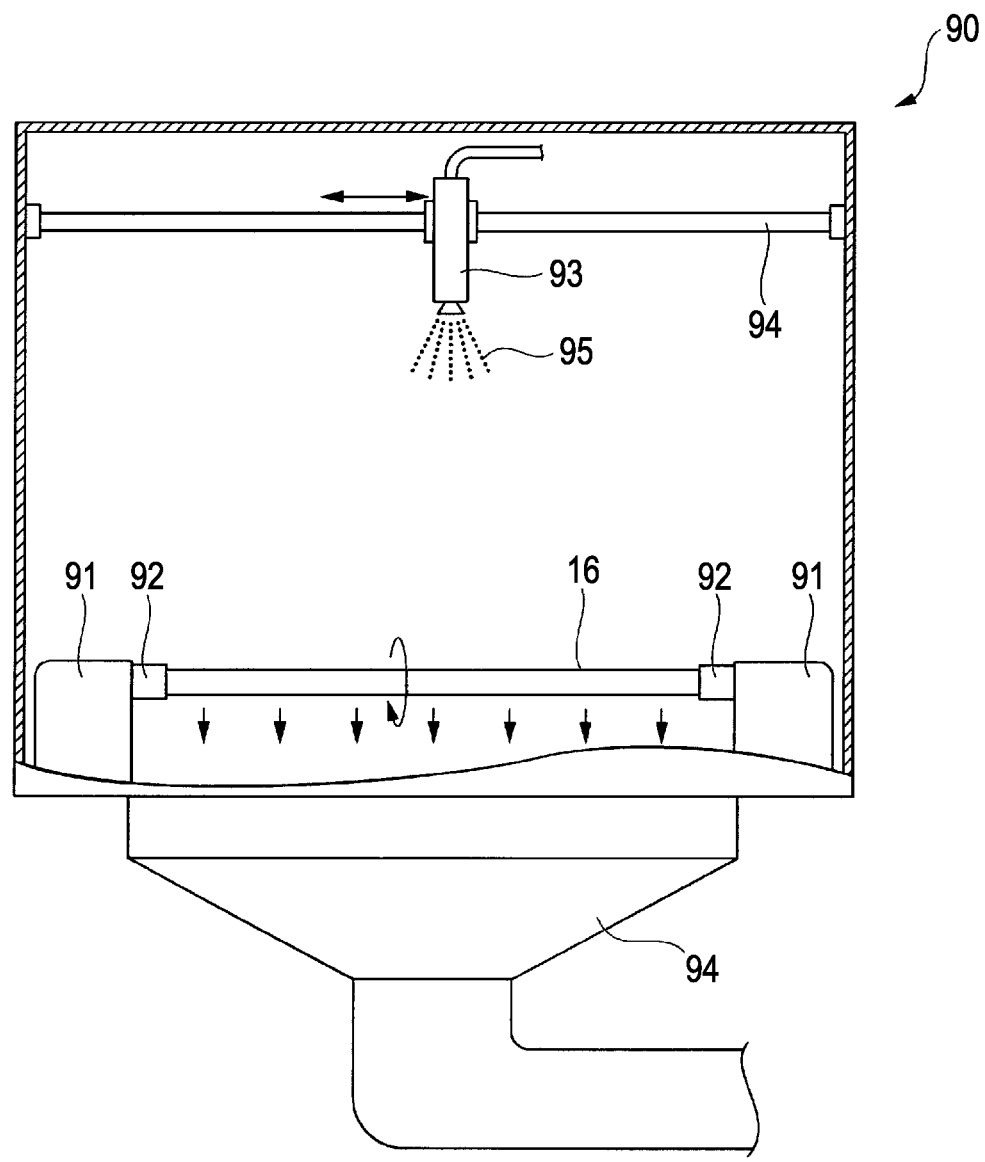
FIG. 9 is a diagram schematically illustrating a configuration of a paint booth for forming a high friction layer.

Next, the roller body 16 on which the resin film 51 is formed is picked out from the painting booth, and is transferred to another painting booth 90 shown in FIG. 9 by a handling robot (not shown). In the painting booth 90, rotation driving members 91 and 91 are provided on the lower portion thereof. In these rotation driving members 91 and 91, chucks 92 are provided to support the roller body 16 to be substantially horizontal. Then, both ends of the roller body 16 are held on and fixed to the chucks 92 and 92, and the chucks 92 and 92 are rotated by the rotation driving member 91. Therefore, the roller body 16 is rotationally driven around the shaft thereof at a slow speed of about, for example, 100 rmp to 500 rmp. Further, it is a matter of course that the roller body 16 may be somewhat obliquely supported.

In addition, in the painting booth 90, a corona gun 93 is disposed on the upper portion thereof. The corona gun 93 moves on the shaft 94 in a horizontal direction in FIG. 9. In addition, an evacuating mechanism 94 is provided on the bottom portion of the painting booth 90. With the evacuating mechanism 94, an air current slowly flows to the lower side in the painting booth 90. Further, the amount of suction air of the evacuating mechanism 94 is adequately set.

On the basis of such a configuration, while the roller body 16 is rotated around the shaft thereof and the alumina particles 95 are sprayed and blown out from the corona gun 93, the alumina particles 95 are selectively electrostatically-adsorbed on the resin film 51 formed on the roller body 16. In order to selectively electrostatically-adsorb the alumina particles on the resin film 51, both ends of the roller body 16 are masked by a tape or the like similar to the case of forming the resin film 51.

At the time of electrostatic coating, the surface potentials of the chuck 92 and the rotation driving member 91 are set to be substantially equal to the potential of the roller body 16, and moreover an inner surface potential of the painting booth 90 is set to be electrically neutralized so as to have a potential equivalent to substantial zero. This is because the alumina particles 95 from the corona gun 93 are not adsorbed to portions excepting the roller body 16. In order to keep the inner surface potential of the painting booth 90 electrically neutralized, it is preferable that the painting booth 90 is manufactured using a steel plate of which the electrical resistance of the inner surface is about, for example, $10^{11}\Omega$.

Then, the potential applied on the corona gun 93 is set to 0 V, and an air pressure applied to the corona gun 93 is set to be low, about 0.2 Mpa. While the corona gun 93 moves in the horizontal direction in FIG. 9, the alumina particles 95 with about a zero potential are blown out from the upper side and thus the alumina particles 95 are freely fell by one's own weight in the vertical direction. Then, as described above, weak static electricity (about +0.5 KV) remains on the resin film 51 of the roller body 16 because the resin film 51 is formed by the electrostatic coating, so that alumina particles 95 are uniformly dispersed over the entire peripheral surface of the resin film 51 by the static electricity. The electrostatically adsorbed alumina particles 95 come into contact with the surface of the resin film 51 and a part thereof are in a state of being injected into the resin film 51, so that the outer peripheral surface of the roller body 16 is attached with the resin film 51 as a binder.

Here, in this embodiment, the inner surface potential of the painting booth 90 is electrically neutralized so as to have a potential equivalent to substantial zero. Furthermore, since an air current in the paint booth 90 is formed to flow slowly to the lower side, the alumina particles 95 freely fall under their own weight in a vertical direction. On the lower side in the falling direction, the roller body 16 is horizontally supported and slowly rotates around the shaft, so that alumina particles 95 are uniformly dispersed on the outer peripheral surface of the roller body 16.

Figure 8B:
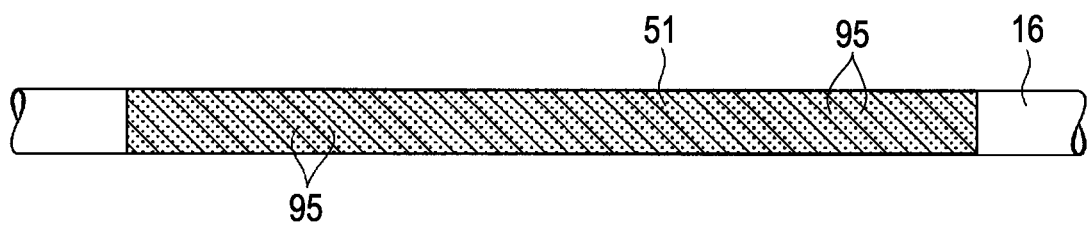
FIG. 8B is a diagram illustrating a formation process of a high friction layer on a roller body.

Therefore, in particular, the alumina particles 95 are uniformly attached on the surface of the resin film 51 which is not masked. Therefore, in the roller body 16, the alumina particles (inorganic particles) 95 are dispersed in and exposed from the resin film 51 on the center portion as shown in FIG. 8B. That is, when the alumina particles 95 come into contact with the resin film 51 by an electrostatic adsorption force, a part of the particles are injected into the resin film 51 so as to be in a state where the rest protrudes from the surface of the resin film 51. At this time, since the alumina particles 95 are easily vertically erected with respect to the surface of the roller body 16, the alumina particles 95 are uniformly distributed, and the most particles are attached such that the sharply-pointed ends (top portions) thereof face the outside.

Therefore, the alumina particles 95 exhibit a high frictional force due to the ends protruding from the surface of the resin film 51. Further, in order for the alumina particles 95 to exhibit a necessary and sufficient frictional force with respect to the paper P, it is preferable that an area occupied by the alumina particles 95 to an area of the resin film 51 is 20% to 80%.

Further, the coating (dispersion) of the alumina particles 95 is not limited to the coating by the electrostatic coating scheme as long as the alumina particles 95 are slowly dispersed to the lower side in the vertical direction. For example, a coating (dispersion) scheme using a spray gun may be employed.

Figure 8C:
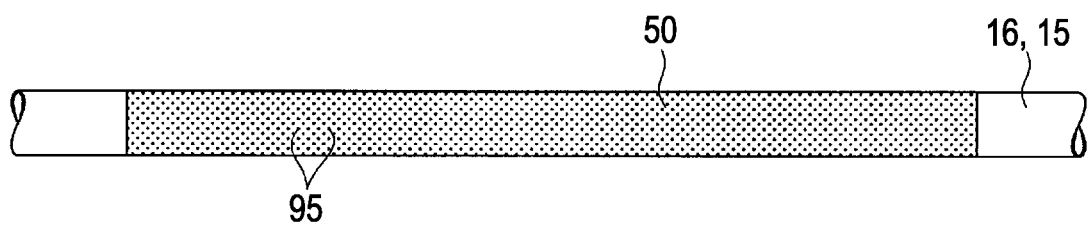
FIG. 8C is a diagram illustrating a formation process of a high friction layer on a roller body.

After the alumina particles 95 are dispersed on and attached to the resin film 51 as described above, the roller body 16 is heated at about 180° C. to 300° C. for 20 to 30 minutes and the resin film 51 is burned so as to be cured, so that the alumina particles 95 are fixed on the roller body 16. As a result, as shown in FIG. 8C, the alumina particles (inorganic particles) 95 are dispersed in and exposed from the resin film 51 so as to form the high friction layer 50, and the transport roller 15 according to the invention is obtained.

Further, in the above-mentioned embodiment, the coating (spraying) of the resin particles and the coating (spraying) of the alumina particles (inorganic particles) are carried out in the separate painting booths, but it is a matter of course that both coatings may be carried out in the same painting booth.

When the high friction layer 50 is formed as described above, in particular the joining portion 80 shown in FIGS. 7A and 7B, there is no groove caused by the gap between the end surfaces 61a and 61b of the metal plate 60, and the gap between the end surfaces 61a and 61b is buried mainly by the alumina particles 95.

Figure 10:
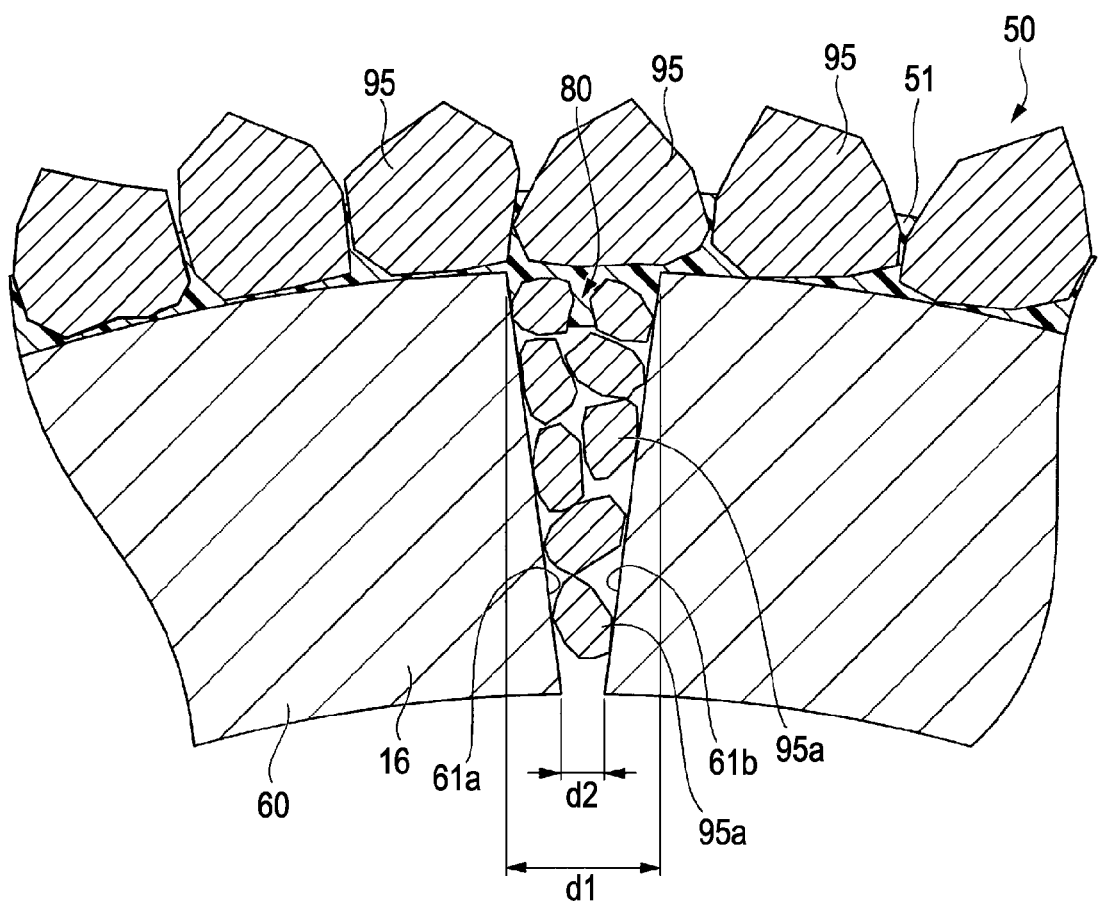
FIG. 10 is an enlarged view illustrating a main part of a joining portion of a roller body and the vicinity thereof.

That is, the alumina particles 95 are used of which the average particle diameter is larger than the distance d1 on the outer peripheral surface side of the joining portion 80. Therefore, most of the alumina particles 95 do not enter the joining portion 80, but as shown in FIG. 10, attached on the outer peripheral surface of the roller body 16 via the resin film 51. Therefore, regardless of whether or not the gap is formed in the joining portion 80 between the end surfaces 61a and 61b of the metal plate 60, the alumina particles 95 cover the gap, so that the groove caused by the gap is substantially not formed.

In addition, the alumina particles 95 are used of which the particle diameter distribution (particle size range) includes the particles 95a, smaller than the distance d1 on the outer peripheral surface side and larger than the distance d2 (10 μm) on the inner peripheral surface side of the joining portion 80. Therefore, the particles 95a enter the gap which is formed in the joining portion 80 so as to remain therein, so that the groove caused by the joining portion 80 is reliably not formed. In addition, even though a force is applied to the roller body 16 (transport roller 15) in a direction to narrow the gap when it is operating, the alumina particles 95a, which enter the gap, stand against the force, so that deformation of the roller body 16 (transport roller 15) is prevented. Therefore, the transport roller mechanism 19 provided with the transport roller 15 is prevented from undergoing uneven transportation which is caused by the deformation of the transport roller 15.

Furthermore, the particle diameter distribution of the alumina particles 95 is used of which a minimum particle diameter is adjusted to be larger than the shortest distance between the pair of the end surfaces 61a and 61b of the joining portion 80, that is, the distance d2 on the inner peripheral surface side thereof. When the alumina particles 95 are mixed so as to form the high friction layer 50 on the surface of the roller body 16, the alumina particles 95 do not pass through the gap formed in the joining portion 80 so as not to enter the roller body 16. Therefore, a subsequent process for cleaning the inside of the roller body 16 is alleviated, so that productivity can be improved by that much.

In the transport roller 15 which includes the high friction layer 50 formed as described above, there is no groove caused by the joining portion 80, so that uneven transportation caused by the groove is prevented.

In addition, both ends of the roller body 16 (transport roller 15) are generally a part for attaching the connection element of the driving system such as a toothed wheel. The center portion of the roller body 16 comes into direct contact with the paper P (recording medium). Therefore, in this embodiment, since the high friction layer 50 is provided on the center portion excepting both ends of the roller body 16, the transportation performance of the paper P is not degraded, and the cost of the material for the high friction layer 50 can be reduced to a minimum.

Figure 11A:
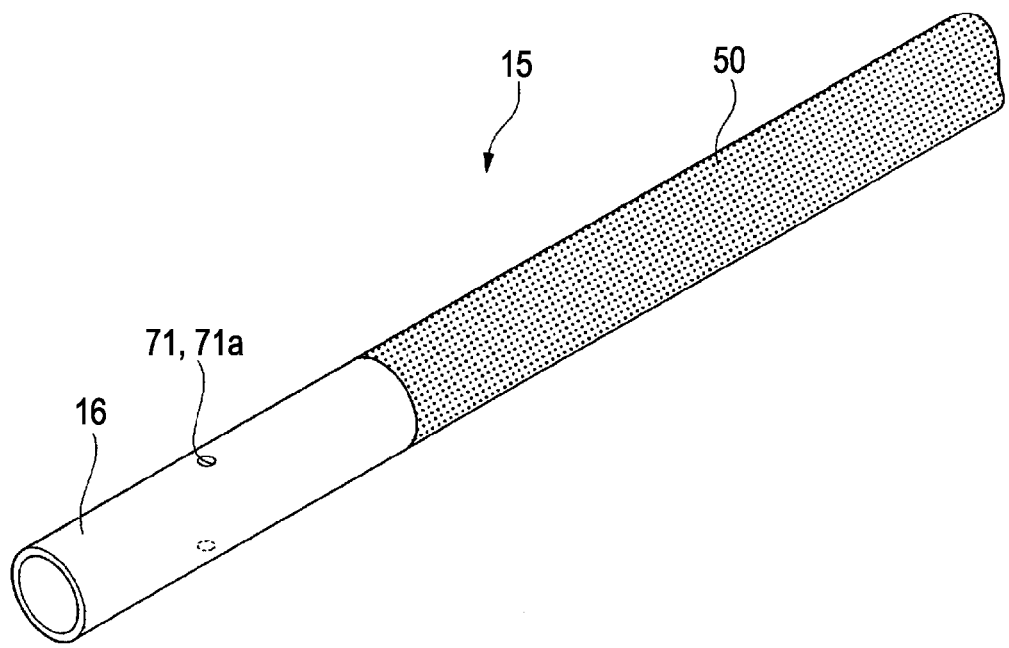
FIG. 11A is a perspective view illustrating a main part of a roller body.
Figure 11B:
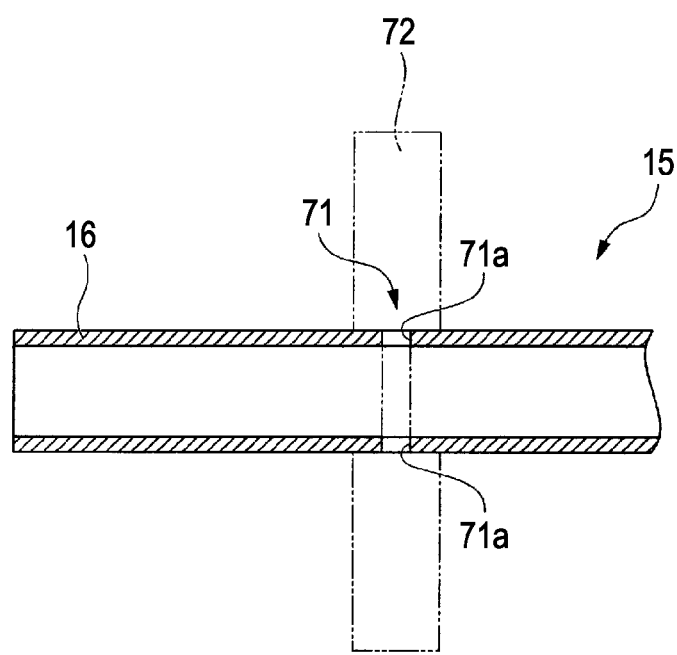
FIG. 11B is a sectional side view illustrating a main part of a roller body.

Here, on one end or both ends of the roller body 16 (transport roller 15), an engaging section can be formed for connecting various connection elements such as the transport driving gear 35 or the inner gear 39 shown in FIG. 2. For example, as shown in FIGS. 11A and 11B, the respective through holes 71*a* and 71*a* are formed on positions facing the roller body 16 which is constituted by the cylindrical pipe (hollow pipe), that is, on two forming surfaces which define a diameter of the roller body 16. Then, an engaging hole (engaging section) 71 including the pair of the through holes 71*a* and 71*a* can be formed. According to the engaging hole 71, the connection element 72 such as a toothed wheel can be fixed by a shaft or a pin (not shown).

Figure 12A:
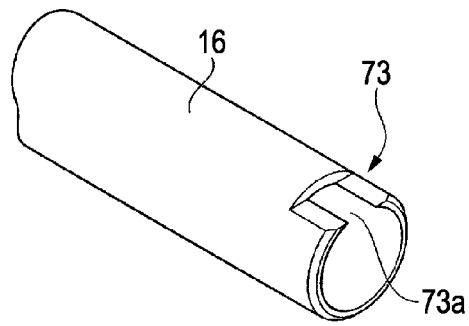
FIG. 12A is a perspective view illustrating a main part of a roller body.
Figure 12B:
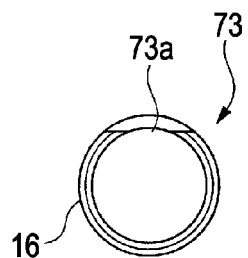
FIG. 12B is a side view illustrating a roller body.

In addition, as shown in FIGS. 12A and 12B, a D-cut engaging section 73 may be formed on an end of the roller body 16. The engaging section 73 is formed on an end of the cylindrical hollow pipe (roller body 16). In addition, as shown in FIG. 12A, a part of the engaging section 73 is notched in a rectangular shape in plane view, so that an opening 73*a* is formed. Therefore, as shown in FIG. 12B, the appearance of the side surface of the end is formed to be an apparent D.

Therefore, the connection element (not shown) such as a toothed wheel is engaged with the engaging section 73 which is formed in an apparent D, so that the connection element can be attached to the roller body 16 (transport roller 15) without rotating with respect to the roller body 16. In addition, in the engaging section 73, an opening 73*a* in a groove shape is formed to be linked with an inner hole of the hollow pipe (roller body 16). Therefore, even using the opening 73*a*, the connection element can be attached to the roller body 16 without slippage. Specifically, a convex portion is formed on the connection element in advance, and the convex portion is fitted with the opening 73*a*, so that free running can be prevented.

Figure 13A:
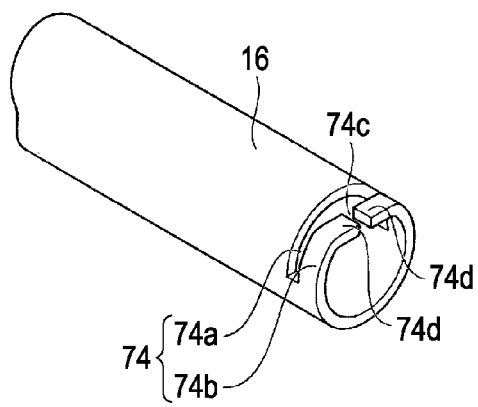
FIG. 13A is a perspective view illustrating a main part of a roller body.
Figure 13B:
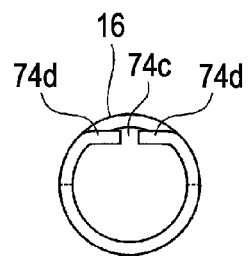
FIG. 13B is a side view illustrating a roller body.

In addition, as shown in FIGS. 13A and 13B, an engaging section 74 which includes a groove 74*a* and a D-cut portion 74*b* may be formed on the end of the roller body 16. In the engaging section 74, the D-cut portion 74*b* is formed on the outer end of the roller body 16, and the groove 74*a* is formed on the inside from the D-cut portion 74*b*. As shown in FIG. 13A, the groove 74*a* is formed by notching half of the roller body 16 in the circumference direction thereof. The D-cut portion 74*b* includes an opening 74*c* which is extended in a direction perpendicular to the groove 74*a* in the outside of the groove 74*a*, and a pair of folded pieces 74*d* and 74*d* on both sides of the opening 74*c*. That is, as shown in FIG. 13B, the pair of the folded pieces 74*d* and 74*d* is folded toward the center axis of the roller body 16. Portions corresponding to these folded pieces 74*d* and 74*d* are dented from the circular outer peripheral surface of the roller body 16.

Therefore, the connection element (not shown) such as a toothed wheel is engaged with the groove 74*a* or the D-cut portion 74*b*, so that the connection element can be attached to the roller body 16 (transport roller 15) without slippage. In addition, in the engaging section 74, even using the opening 74*c* formed between the folded pieces 74*d*, the connection element can be attached to the roller body 16 without slippage. Specifically, a convex portion is formed on the connection element in advance, and the convex portion is fitted with the opening 74*c*, so that the idle running can be prevented.

Figure 14A:
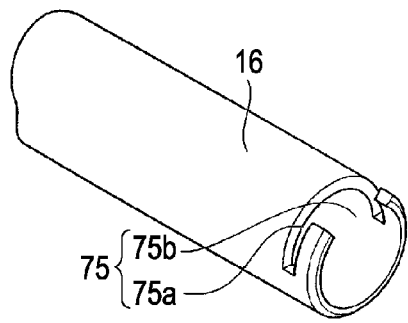
FIG. 14A is a perspective view illustrating a main part of a roller body.
Figure 14B:
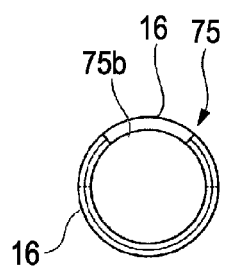
FIG. 14B is a side view illustrating a roller body.

In addition, as shown in FIGS. 14A and 14B, an engaging section 75 which includes a groove 75*a* and an opening 75*b* may be formed on the end of the roller body 16. In the engaging section 75, the opening 75*b* is formed on the outer end of the roller body 16, and the groove 75*a* is formed on the inner end from the opening 75*b*. As shown in FIG. 14A, the groove 75*a* is formed by notching half of the roller body 16 in the circumference direction thereof. The opening 75*b* is formed by notching a part of the roller body 16 in a rectangular shape in plane view on the outside of the groove 75*a*, so that as shown in FIG. 14B, the appearance of the side surface of the end is formed to be an apparent D.

Therefore, the connection element (not shown) such as a toothed wheel is engaged with the groove 75*a* or the portion which is formed in the apparent D by the opening 75*b*, so that the connection element can be attached to the roller body 16 (transport roller 15) without slippage. In addition, in also the engaging section 75, even using the opening 75*b* similarly to the engaging section 73 shown in FIGS. 12A and 12B, the connection element can be attached to the roller body 16 without slippage.

The roller body 16 obtained by the pressing work on the metal plate 60 is subjected to a cutting work or the like, so that the engaging hole 71 and the engaging sections 73, 74, and 75 can be formed. For example, in the engaging section 73 shown in FIGS. 12A and 12B, the end thereof is subjected to the cutting work so as to form the opening 73*a*, and thus the engaging section 73 in the apparent D can be formed. In addition, also in the engaging hole 71 shown in FIGS. 11A and 11B, the roller body 16 is subjected to a punching work, so that the pair of the through holes 71*a* and 71*a* can more suitably face.

However, implementing another work on the roller body 16 as described above degrades the efficiency in cost and time because separate work processes are added only to form the engaging sections. Therefore, before the roller body 16 is subjected to the press work, a developed engaging section which becomes the engaging section is formed with a metal plate by another press work in advance. Then, when the metal plate is subjected to the press work so as to form the roller body 16, it is preferable that the engaging section is also formed at the same time.

Figure 15A:
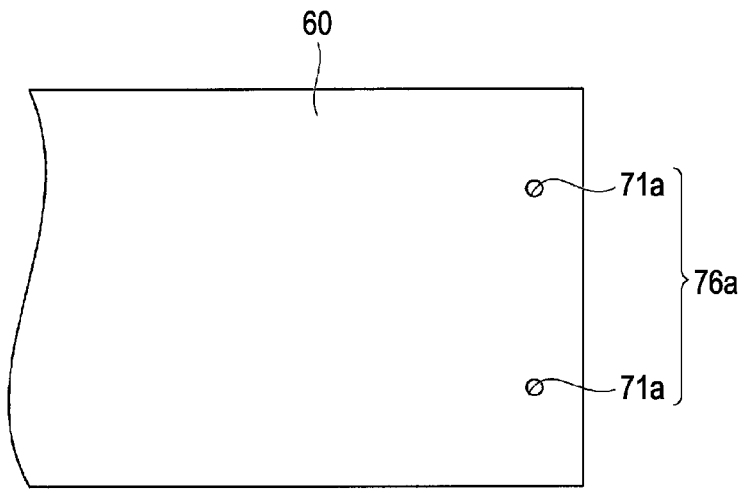
FIG. 15A is a plan view illustrating a main part of a metal plate showing a developed engaging section.

Specifically, a large-scale metal plate (first metal plate) 65 shown in FIG. 4A is subjected to the press work so as to form a thin and long rectangular plate-shaped metal (second metal plate) 60 as shown in FIG. 4B. In the press work, the large-scale metal plate 65 is machined in the small-scale metal plate 60. While at the same time, the developed engaging section in a shape, such as a notch shape, a protruding piece shape, a hole shape, or a groove shape, is formed on the end of the obtained metal plate 60. For example, as shown in FIG. 15A, the pair of the through holes 71*a* and 71*a* is machined on a predetermined position of the end of the metal plate 60 so as to prepare these as a developed engaging section 76*a*. Then, the metal plate 60 is subjected to the press work, so that the pair of the through holes 71*a* and 71*a* face each other, and thus the engaging hole 71 shown in FIGS. 11A and 11B can be formed.

Figure 15B:
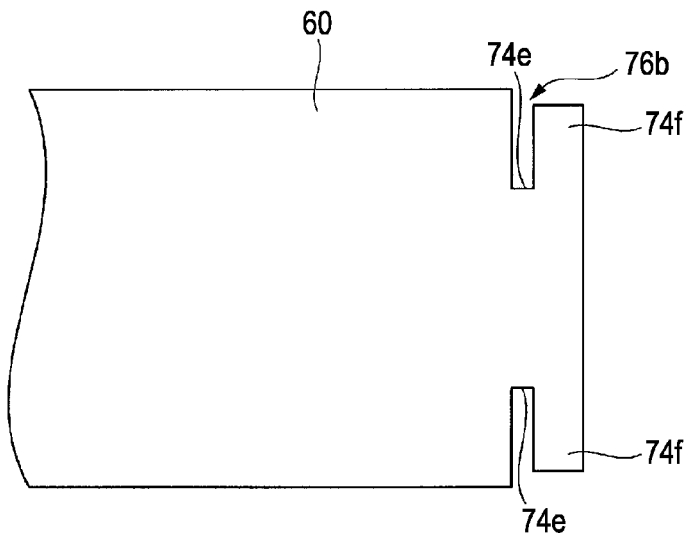
FIG. 15B is a plan view illustrating a main part of a metal plate showing a developed engaging section.

In addition, as shown in FIG. 15B, the end of the metal plate 60 is notched in a predetermined shape so as to be prepared as a developed engaging section 76*b*. Then, the metal plate 60 is subjected to the press work, so that the engaging section 74 shown in FIGS. 13A and 13B can be formed. That is, a pair of notched portions (concave portions) 74*e* and 74*e* and a pair of protruding pieces 74*f* and 74*f* are formed as a developed engaging section 76*b*, so that the engaging section 74 can be formed. In this example, after the metal plate 60 is subjected to the press work, it is necessary that the pair of the protruding pieces 74*f* and 74*f* is subjected a folding work to be folded to the inside, so that the folded piece 74*d* is formed. Therefore, it can be regarded as that the work process is slightly insufficient for increasing the efficiency in cost and time.

Figure 15C:
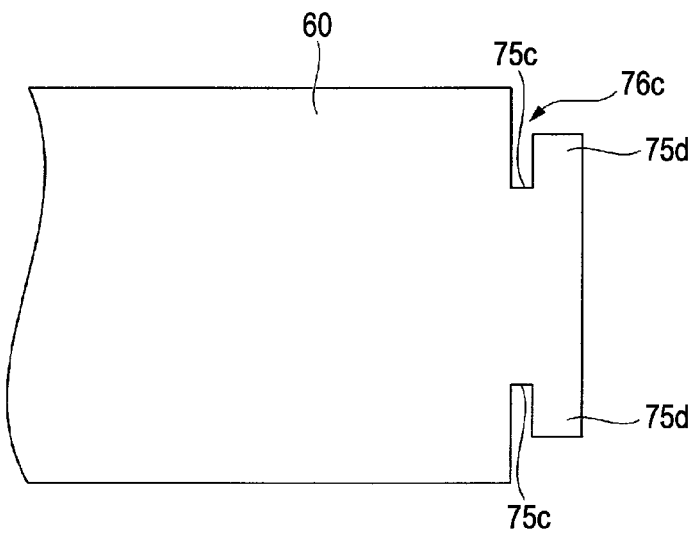
FIG. 15C is a plan view illustrating a main part of a metal plate showing a developed engaging section.

As shown in FIG. 15C, the end of the metal plate 60 is notched in a predetermined shape so as to be prepared as a developed engaging section 76*c*. Then, the metal plate 60 is subjected to the press work, so that the engaging section 75 shown in FIGS. 14A and 14B can be formed. That is, a pair of notched portions (concave portions) 75c and 75c and a pair of protruding pieces 75d and 75d are formed as a developed engaging section 76c, so that the engaging section 75 can be formed. In this example, when the metal plate 60 is subjected to the press work, the pair of the protruding pieces 75d and 75d is also bent in an arcuate shape, so that the opening 75b shown in FIG. 14B can be formed between these protruding pieces 75d and 75d. Therefore, the roller body 16 formed by the press work is unnecessary to be subjected to additional work. In addition, the work process can be sufficient for increasing the efficiency in cost and time.

In addition, as shown in FIG. 7B, in the transport roller 15 (roller body 16) according to the embodiment, the joining portion 80 is formed to be parallel to the center axis of the roller body 16 which is constituted by the cylindrical hollow pipe, but the invention is not limited thereto. For example, the joining portion which is formed between the pair of the ends of the metal plate 60 as the base material may be formed not to be overlapped on a line segment with respect to a straight line but only on one or plural points in the straight line parallel to the center axis of the cylindrical pipe, on the outer peripheral surface of the cylindrical pipe (roller body).

Figure 16A:
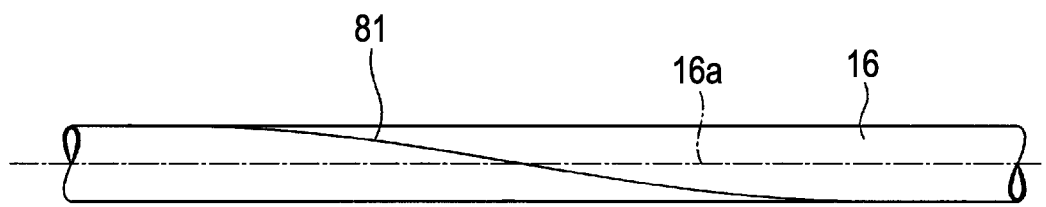
FIG. 16A is a diagram illustrating a joining portion.
Figure 16B:
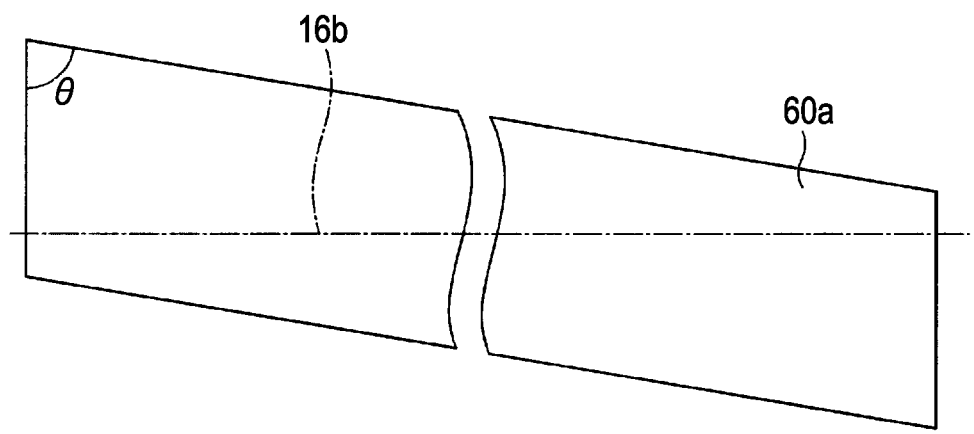
FIG. 16B is a plan view illustrating a metal plate.

Specifically, as shown in FIG. 16A, a joining portion 81 may be formed to be disposed from one end of the roller body 16 to the other end thereof such that the outer peripheral surface of the roller body 16 is extended to the circumference direction thereof so as not to be parallel to but to intersect the center axis 16a of the roller body 16. In order to form the joining portion 81 as described above, the thin and long rectangular-shaped metal plate 60 as shown in FIG. 4B is not used as a metal plate as the base material, but a thin and long parallelogram metal plate 60a as shown in FIG. 16B is used. Then, the metal plate 60a is subjected to the press work such that the straight line denoted by the reference numeral 16b corresponds to the center axis. Therefore, the roller body 16 shown in FIG. 16A is obtained, and the joining portion 81 is formed not to be parallel to the center axis 16a.

Figure 16C:
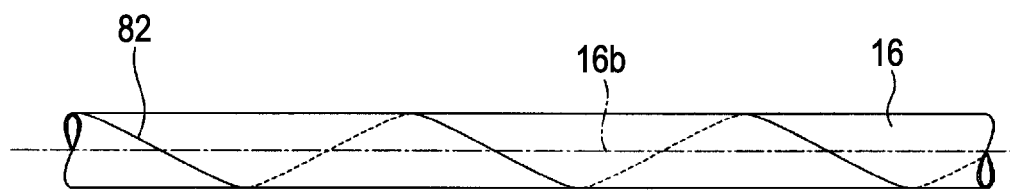
FIG. 16C is a diagram illustrating a joining portion.

Further, in the roller body 16 shown in FIG. 16A, the joining portion 81 is formed to be routed around the circumference surface of the roller body 16 by only less than one round from one end of the roller body 16 to the other end thereof. This is because the press work of the metal plate 60a is easily carried out. In this case, as shown in FIG. 16C, a joining portion 82 may be formed to be routed around the circumference surface of the roller body 16 by one round or more, that is, in order to be turned in a screw shape. In this case, the metal plate as the base material is prepared such that the thin and long parallelogram metal plate 60a shown in FIG. 16B is formed so as to make an acute angle compared with an angle θ.

Figure 17A:
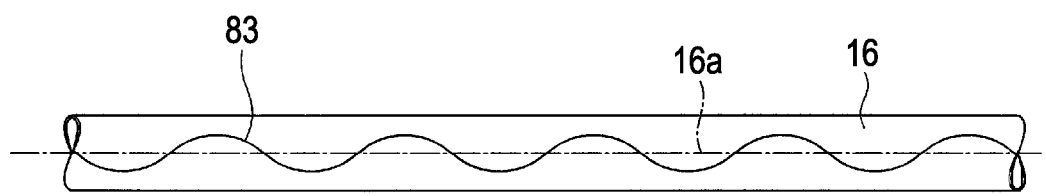
FIG. 17A is a diagram illustrating a joining portion of a roller body.
Figure 17B:
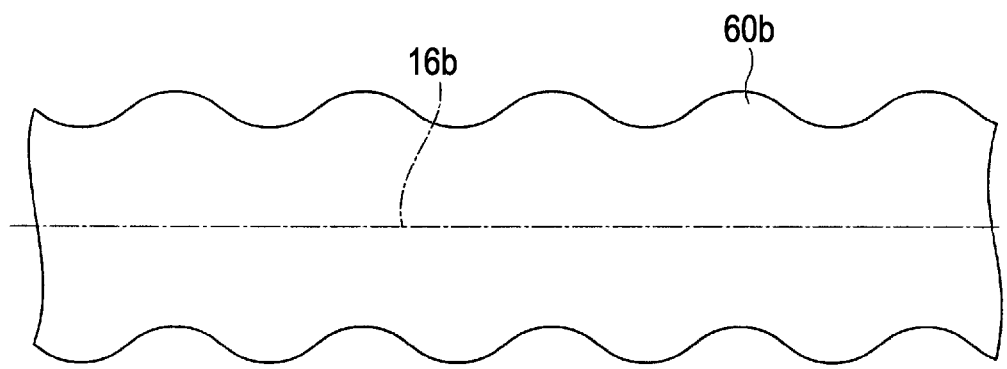
FIG. 17B is a plan view illustrating a metal plate.

In addition, as shown in FIG. 17A, a joining portion 83 may be formed in a wavy line shape such as a sine wave. In order to form the joining portion 83, as shown in FIG. 17B, a thin and long rectangular-shaped metal plate of which long sides are formed in a wavy line shape is used as a metal plate as the base material. The metal plate 60b is subjected to the press work such that the straight line denoted by the reference numeral 16b corresponds to the center axis. Further, the pair of the long sides formed in a wavy line shape is subjected to the press work so as to be close to each other; therefore, between the places corresponding to each other, when one long side corresponds to a ridge, the other long side corresponds to a valley, which is quite natural. On the contrary, when one long side corresponds to a valley, the other long side corresponds to a ridge. In addition, in this example, the center line of the joining portion 83 is formed to be parallel to the center axis of the roller body 16, but the center line of the joining portion 83 may be formed not to be parallel to the center axis of the roller body 16. In this case, a metal plate as the base material is prepared such that the thin and long parallelogram metal plate shown in FIG. 16B is used and both the long sides is formed in a wavy line shape.

Figure 18A:
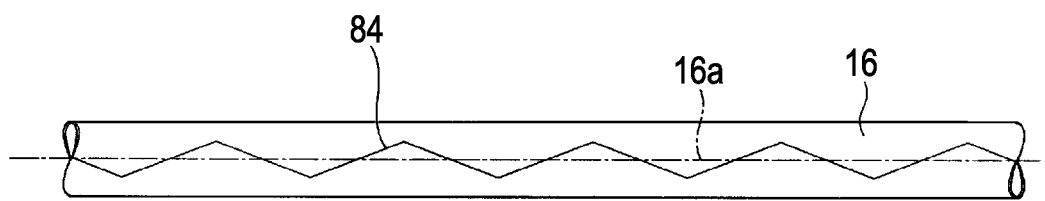
FIG. 18A is a diagram illustrating a joining portion of a roller body.
Figure 18B:
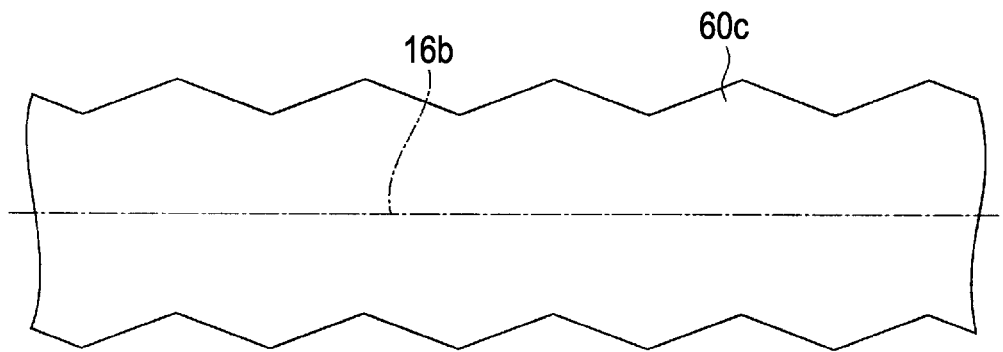
FIG. 18B is a plan view illustrating a metal plate.

In addition, as shown in FIG. 18A, a joining portion 84 may be formed in a wavy line shape so as to be folded into a hooked state. In order to form the joining portion 84, as shown in FIG. 18B, a thin and long rectangular-shaped metal plate 60c of which both the long sides are formed to be in a wavy line shape folded into a hooked state is used as the metal plate as the base material. The metal plate 60c is subjected to the press work such that the straight line denoted by the reference numeral 16b corresponds to the center axis. Also in the metal plate 60c, between the places corresponding to each other in the pair of the long sides formed in the wavy line shape, when one long side corresponds to a ridge, the other long side corresponds to a valley, which is quite natural. On the contrary, when one long side corresponds to a valley, the other long side corresponds to a ridge. Further, also in this example, the center line of the joining portion 84 is formed to be parallel to the center axis of the roller body 16. Similarly to the case of the joining portion 83, the center line of the joining portion 84 may be formed not to be parallel to the center axis of the roller body 16.

In addition, the joining portion is not limited to the examples shown in FIGS. 16 to 18, but various shapes may be employed. For example, the wavy line composed of a curve shown in FIG. 17A may be combined with the folded wavy line shown in FIG. 18A. In addition, the diagonal line as shown in FIG. 16 may be combined with these two wavy lines describe above.

As described above, the joining portions 81 to 84 are formed not to be overlapped on a line segment with respect to the straight line parallel to the center axis of the cylindrical pipe (roller body 16), but to be overlapped only on one or plural points. In this case, when the transport roller 15 including the roller body 16 transports the paper P in cooperation with the driven roller 17, that is, at the time of feeding the paper, the transport speed of the paper P is constantly kept, and uneven transportation can be more reliably prevented.

Figure 19:
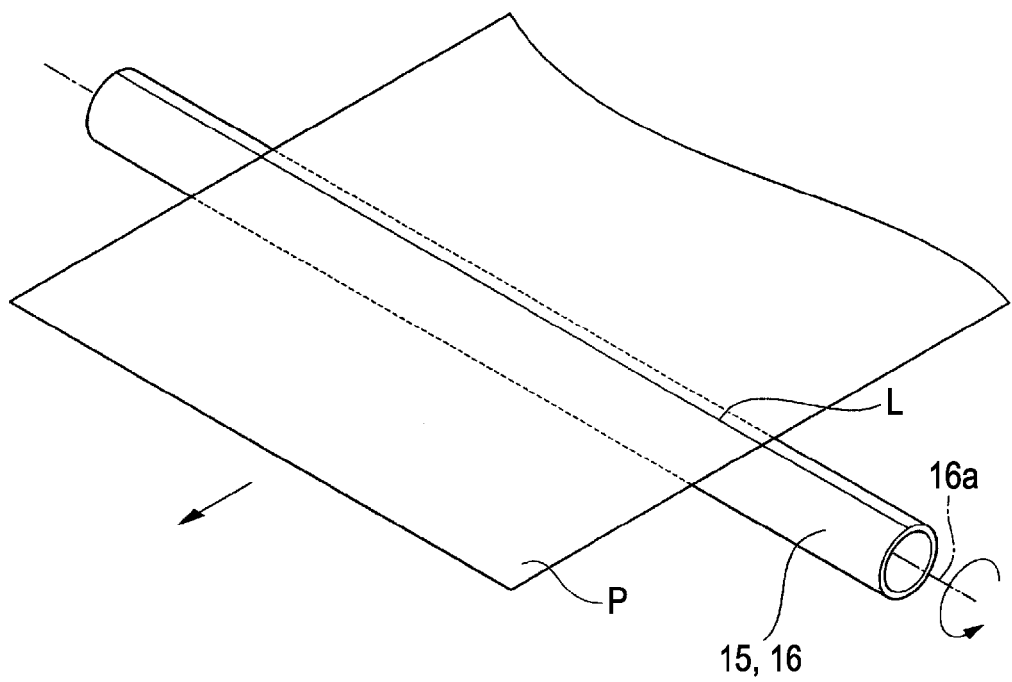
FIG. 19 is a perspective view illustrating relationship between a transport roller and a paper at the time of feeding paper.

That is, as shown in FIG. 19, a place where the transport roller 15 comes into contact with the paper P at the time of feeding the paper basically corresponds to a straight line L on the outer peripheral surface, that is, the straight line L parallel to the center axis 16a. Therefore, as shown in FIG. 7B, when the joining portion 80 of the transport roller 15 (roller body 16) is parallel to the center axis 16a of the roller body 16, the entire joining portion 80 of the transport roller 15 temporarily (instantaneously) comes into contact with the paper P. Then, since the groove caused by the joining portion 80 is not formed in the transport roller 15 of the embodiment as described above, it is out of the problem. However, if the groove is formed caused by the joining portion 80, the groove temporarily and simultaneously comes into contact with the paper P, so that the entire width of the paper P temporarily comes into contact with the groove caused by the joining portion 80. As a result, the groove becomes a hollowed portion compared with other portions of the outer peripheral surface of the transport roller 15, and the contact resistance with respect to the paper P is reduced. Therefore, the transport speed of the paper P is temporarily reduced, and uneven transportation occurs.

Therefore, as shown in FIGS. 16A and 16C, FIG. 17A, and FIG. 18A, when the joining portions 81 to 84 are formed, even if the grove is formed caused by these joining portions, the places where the joining portions simultaneously come into contact with the paper P at the time of feeding the paper are only one or plural points. Therefore, the contact resistance is hardly changed compared with the case where other portions on the surface (line) of the transport roller 15 come into contact with the paper. As a result, the transport speed of the paper P is kept constant, and uneven transportation is prevented.

Figure 20A:
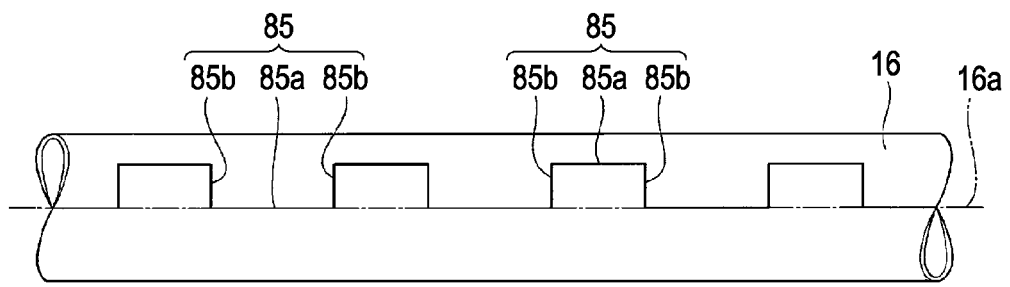
FIG. 20A is a diagram illustrating a shape of a joining portion.

Further, besides the above-mentioned examples, the joining portion of the transport roller 15 (roller body 16) which is constituted by the cylindrical hollow pipe may include, for example, a rectangular folded section 85 which is constituted by a linear section 85*a* parallel to the center axis of the roller body 16 and a linear section 85*b* perpendicular to the linear section 85*a*, as shown in FIG. 20A. Even though the joining portion includes the folded section 85, if the groove is formed caused by the joining portion, the groove does not come into contact with the entire width of the paper P at the time of feeding the paper. Therefore, the transport speed of the paper P is substantially constant, and uneven transportation is prevented.

Figure 20B:
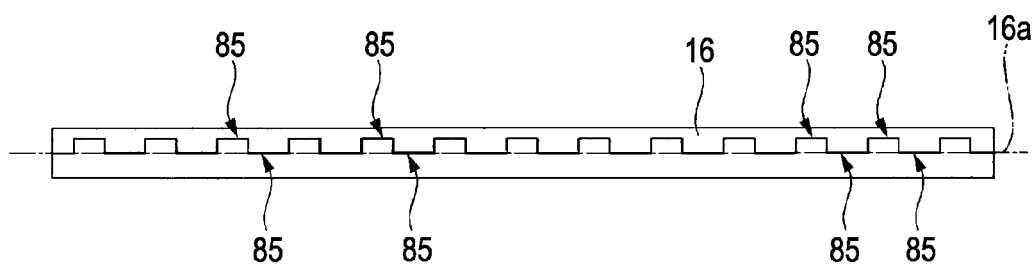
FIG. 20B is a diagram illustrating a shape of a joining portion.
Figure 20C:
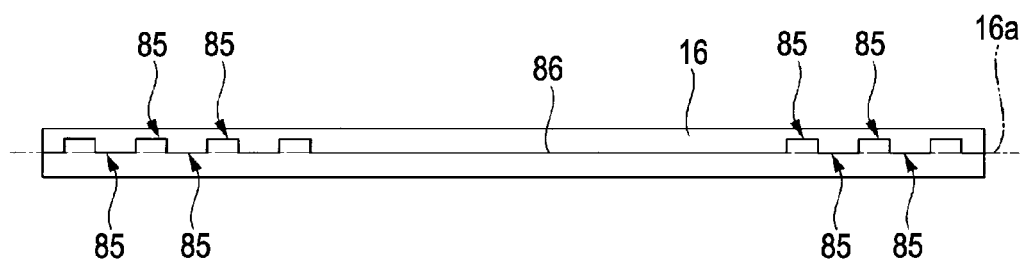
FIG. 20C is a diagram illustrating a shape of a joining portion.

In addition, as shown in FIG. 20B, the folded section 85 may be formed over the entire length of the roller body 16. As shown in FIG. 20C, the folded section 85 may be selectively formed on both ends of the roller body excepting the center portion. As shown in FIG. 20C, when the folded section 85 is formed only on both ends, a portion between these folded sections 85 becomes a central linear section 86 parallel to the center axis of the roller body 16. In this case, the central linear section between the folded sections 85 may be formed in a diagonal line shape so as not to be parallel to the center axis 16*a* as shown in FIG. 16A.

In addition, when the folded sections 85 are formed only on both ends and the center portion therebetween is formed as the central linear section 86, it is preferable that a region of the high friction layer 50 shown in FIG. 8C corresponds to the central linear section 86.

When the folded section 85 is formed in the joining portion and the folded section 85 is used as an fitting section by convex and concave portions, it is difficult that these folded sections 85 (fitting sections) are fitted to each other, and the tip end of the convex portion is close (matched) to the concave portion corresponding thereto without a gap. Therefore, when the folded sections 85 are formed over the entire length of the roller body 16, deformation or distortion easily occurs on the roller body 16. As shown in FIG. 20C, when the folded sections 85 are formed only on both ends, the deformation or the distortion can be prevented. In addition, the center portion corresponding to the high friction layer 50, with which the paper P comes into direct contact, is constituted by the central linear section 86 without the folded sections 85, so that the deformation or the distortion can be surely prevented in the region coming into direct contact with the paper P.

Figure 21A:
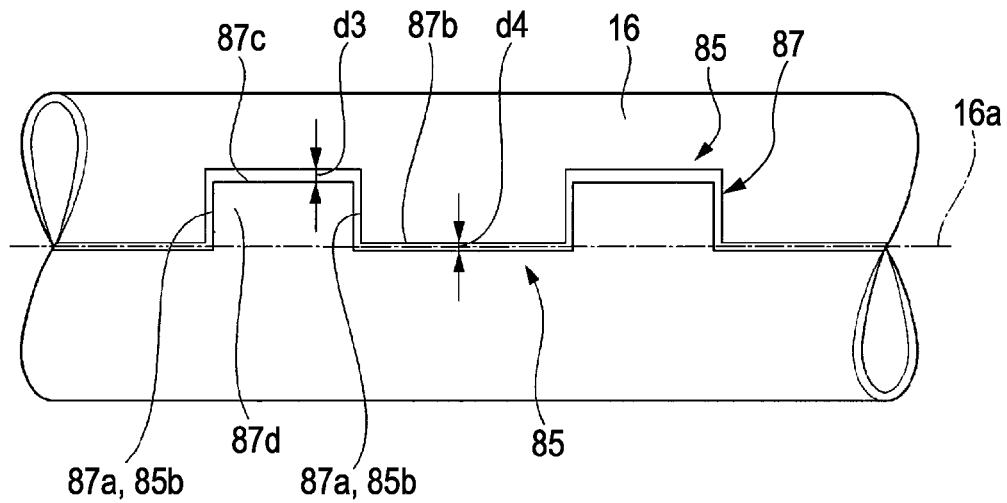
FIG. 21A is a diagram illustrating a shape of a joining portion.

In addition, as shown in FIG. 20B, when the folded sections 85 are formed over the entire length of the roller body 16, a joining portion 87 constituted by the folded section 85 may be formed to include plural intersections 87*a* constituted by the linear sections 85*b*, a first linear section 87*b* connecting one ends of the intersections 87*a*, and a second linear section 87*c* connecting the other ends as shown in FIG. 21A. Here, the first linear section 87*b* and the second linear section 87*c* are formed to be substantially parallel to the center axis of the roller body 16. The intersections 87*a* are formed to be perpendicular to the first linear section 87*b* and the second linear section 87*c*, that is, to be perpendicular to the center axis of the roller body 16. In addition, the second linear section 87*c* is shorter than the first linear section 87*b*.

When the joining portion 87 configured as described above is formed, it is particularly preferable that the distance d3 between the pair of ends facing each other in the second linear section 87*c* is formed to be longer than the distance d4 between a pair of the ends facing each other in the first linear section 87*b*. Further, both the distances d3 and d4 described here is assumed as distances between ends of the gap which is formed on the outer peripheral surface of the roller body 16.

According to such a configuration, the accuracy in shape and dimension of the roller body 16 as the cylindrical hollow pipe can be more increased. Therefore, uneven transportation caused by the deformation of the roller body 16 can be prevented. That is, in the metal plate as the base material for forming the roller body 16 as described above, one end constituting the second linear section 87*c* becomes a convex piece of which the appearance is constituted by the pair of the adjacent intersections 87*a* and 87*a* and the second linear section 87*c* connecting the ends of the intersections. Therefore, when the metal plate is subjected to the press work so as to make the convex piece 87*d* close to the facing end, the tip end of the convex piece 87*d* is not sufficiently bent in a circumference surface shape as marked with a double-dotted chain line in FIG. 21B. Therefore, the convex piece 87*d* is in a floating state by a dimension of t1 with reference to the facing end. As a result, a step is formed in the second linear section 87*c*. Due to the step, deformation occurs easily in the roller body 16 to be obtained. Therefore, it is difficult to obtain the shape and the dimension with good accuracy.

The distance d3 between the ends of the second linear section 87*c* is formed to be longer than the distance d4 between the ends of the first linear section 87*b* which is formed to be longer than the second linear section 87*c*. Therefore, as shown with a solid line in FIG. 21B, the dimension t2 of the floating tip end of the convex pieces 87*d* is less (smaller) than the above-mentioned dimension t1. As a result, the step in the second linear section 87*c* can be suppressed not to occur. Further, in FIG. 21B, the dimension t2 is also illustrated to be shown large in order to be easily recognized, but the dimension t2 is almost close to zero in practice. Therefore, the step substantially disappears. That is, the step is suppressed in the second linear section 87*c*, so that the deformation of the roller body 16 caused by the step is suppressed, and the accuracy in shape and dimension can be increased.

Figure 22:
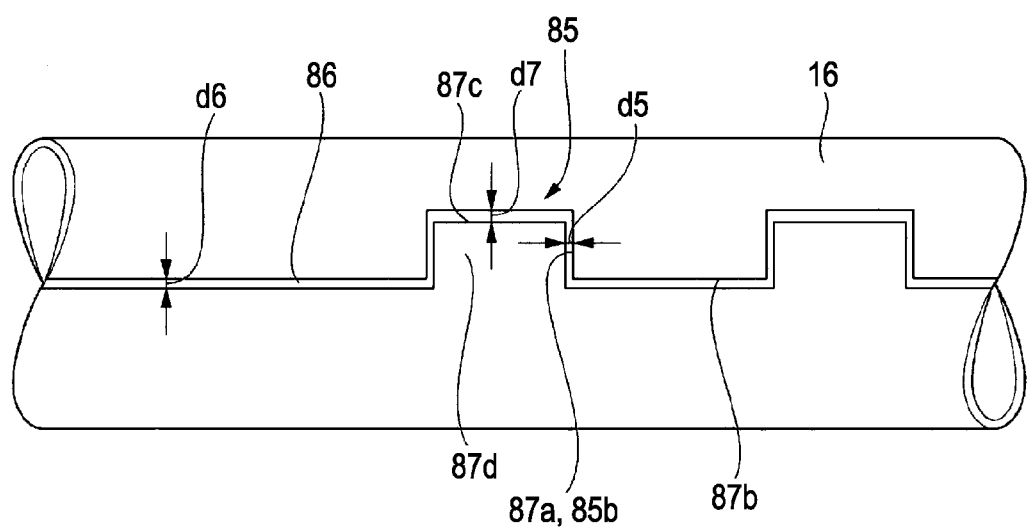
FIG. 22 is a diagram illustrating a shape of a joining portion.

In addition, as shown in FIG. 20C, when the folded sections 85 are formed only on both ends of the roller body 16, it is preferable that the distance d5 between the pair of the ends facing each other in the intersection 87*a* (linear section 85*b*) of the folded section 85 is formed to be shorter than the distance d6 between a pair of the ends facing each other in the central linear section 86, as shown in FIG. 22.

According to such a configuration, the distance d5 is relatively shortened, so that the gap between the ends of the intersection 87*a* is significantly narrowed. Therefore, when the metal plate as the base material for forming the roller body 16 is subjected to the press work, the deviation between one end and the other end in the longitudinal direction (axial direction) is regulated by a pair of the ends facing each other which constitutes the intersection 87*a*. Therefore, the deformation or the distortion hardly occurs on the roller body 16 (transport roller 15) to be obtained. In addition, uneven transportation caused by the deformation or the distortion is prevented.

Further, as shown in FIG. 20C, when the folded sections 85 are formed only on both ends of the roller body 16, the distance d7 between a pair of the ends which face each other in the second linear section 87c constituting the convex pieces 87d of the folded section 85 may be formed to be shorter than the distance d6 between a pair of the ends facing each other in the central linear section 86 or may be formed to be longer, as shown in FIG. 22.

When the distance d7 is formed to be shorter than the distance d6, the gap generated between a pair of the ends facing each other is easily uniformalized. Therefore, the accuracy in shape or dimension of the roller body 16 to be obtained is more increased. That is, the length of the central linear section 86 is longer than the length of the second linear section 87c of the folded section 85, so that the pair of the ends of the central linear section 86 can be formed to be close to each other with good accuracy compared with the second linear section 87c. Even though the distance between the pair of the ends of the central linear section 86, in which the accuracy between the ends can be relatively favorable, is formed to be longer than that of the second linear section 87c so as to form a large gap, it is possible to sufficiently uniformalize the gap. Therefore, uneven transportation caused by the deformation or the distortion of the roller body 16 to be obtained is prevented.

Figure 21B:
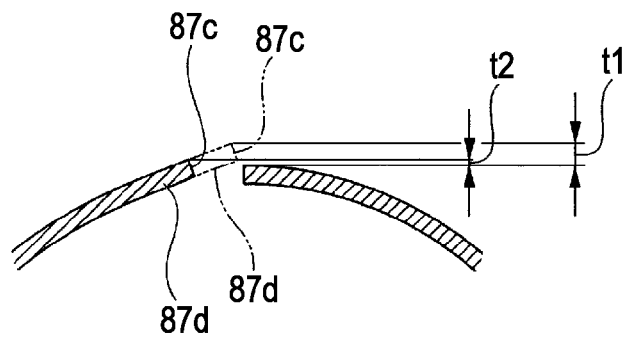
FIG. 21B is a diagram illustrating an operation.

On the other hand, when the distance d7 is formed to be longer than the distance d6, the dimension t2 of the floating tip end of the convex pieces 87d is less (smaller) than the above-mentioned dimension t1, as shown with a solid line in FIG. 21B. As a result, the step in the second linear section 87c can be suppressed not to occur. Since the step in the second linear section 87c can be suppressed not to occur, the deformation of the roller body 16 caused by the step is suppressed, and the accuracy in shape or dimension is increased, so that uneven transportation is prevented.

Figure 23A:
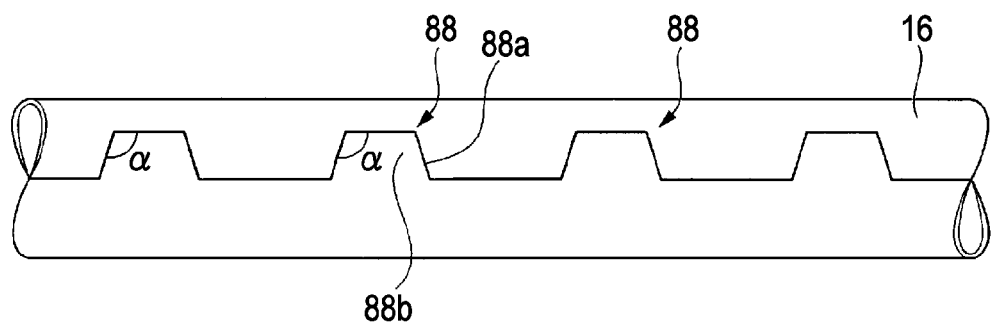
FIG. 23A is a diagram illustrating a shape of a joining portion.

Further, besides the above-mentioned examples, the joining portion of the transport roller 15 (roller body 16) which is constituted by the cylindrical hollow pipe may include, for example, as shown in FIG. 23A, an intersection 88a of a folded section 88 which is formed not to be parallel to the center axis of the roller body 16, and the angle α of the tip end of the convex piece 88b in the folded section 88 which is formed so as to make a blunt angle (180° or less). In such a configuration, when the pair of the ends is formed to be close to each other in the press work of the metal plate, the tip end of the convex piece 88b is easily fitted with the corresponding concave portion. Therefore, the deformation or the distortion of the roller body 16 can be prevented.

Figure 23B:
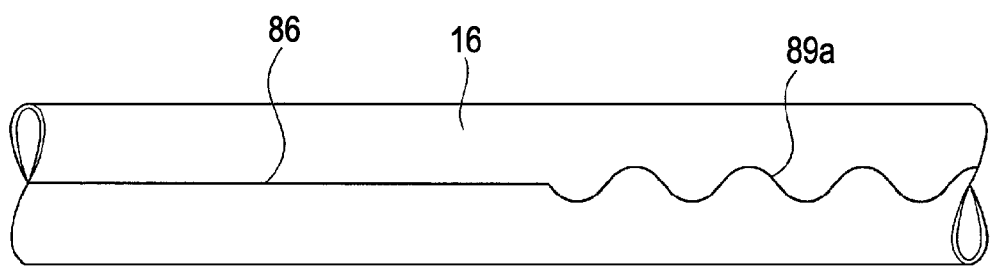
FIG. 23B is a diagram illustrating a shape of a joining portion.
Figure 23C:
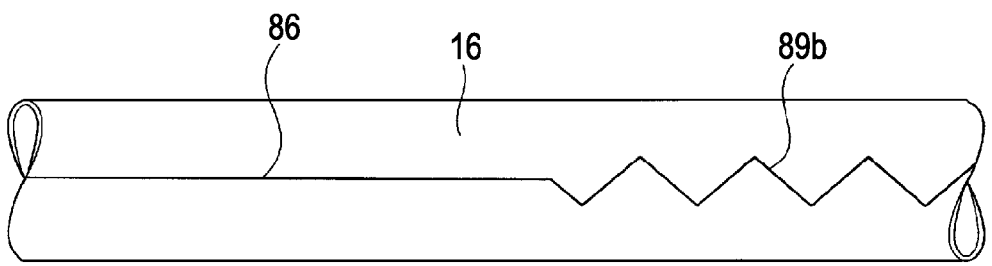
FIG. 23C is a diagram illustrating a shape of a joining portion.

In addition, as shown in FIG. 20C, in the structure where the folded section 85 is formed on both ends, the folded section 85 may be formed as shown in FIG. 23B instead of the wavy line 89a constituted by a curve shown in FIG. 17A. In addition, the folded section 85 shown in FIG. 18A may be formed as shown in FIG. 23C instead of the folded wavy line 89b.

In addition, the joining portion may be formed by combining the folded section 85 in the rectangular shape shown in FIG. 20A and the wavy line 89a constituted by a curve shown in FIG. 23B. Alternatively, the joining portion may be formed by combining the folded section 85 in the rectangular shape and the folded wavy line 89b as shown in FIG. 23C.

Next, operations of an ink jet printer (printing apparatus) 1, which is provided with the transport roller mechanism 19, will be described with reference to FIGS. 1 and 2.

When the paper P fed by the paper feeding roller 13 reaches the vicinity of the transport roller mechanism 19 in an upstream side, the paper P enters between the transport roller 15 and the driven roller 17. Then, as both rollers are driven, the paper P is transported to the lower side of the print head 21 which is positioned on a downstream side.

At this time, since the high friction layer 50 is formed on the transport roller 15 and the driven roller 17 is disposed in a position coming into contact with the high friction layer 50, the force for interposing the paper P between the transport roller 15 and the driven roller 17 becomes large, so that the transportability of the paper P is more favorable. In particular, since the alumina particles with a predetermined particle diameter are used when the high friction layer 50 is formed, the transport roller 15 has no groove caused by the joining portion 80. Therefore, uneven transportation caused by the groove is also prevented. Accordingly, the transport roller mechanism 19 feeds (transport) paper with great accuracy and stability.

When the starting end of the paper P reaches a predetermined printing position under the print head (print unit) 21, the printing starts.

Thereafter, when the leading end of the paper P reaches the discharge roller mechanism 27, a paper discharge operation starts. Further, since the transport speed of the discharge roller mechanism 27 is set to be higher than the transport speed of the transport roller mechanism 19, the paper P is transported under back tension. In this case, when the transport roller mechanism 19 and the discharge roller mechanism 27 interpose the paper P at the same time, the transport speed of the paper is defined by the transport speed of the transport roller mechanism 19 as described above. Therefore, even when discharging and transporting are carried out by the discharge roller mechanism 27 and the transport roller mechanism 19 at the same time, the transport speed of the paper is defined by the transport speed of the transport roller mechanism 19. Therefore, the paper is accurately and stably fed (transported) without uneven transportation.

As described above, in the transport roller 15 according to the embodiment, the roller body 16 is used which is obtained such that the metal plate is subjected to the press work to be formed in a cylindrical shape. Therefore, the cost reduction and the weight reduction can be achieved compared with the case where a round bar made of a solid material is used. In addition, since the high friction layer 50 containing the alumina particles (inorganic particles) is provided on the surface of the roller body 16, a good transportation force can be exhibited by the high friction layer 50.

Furthermore, as shown in FIG. 10, the average particle diameter (central diameter) of the alumina particle 95 is made to be larger than the distance d1 between the pair of the ends of the joining portion 80 of the roller body 16 in the outer peripheral surface. Therefore, when the high friction layer 50 is formed on the surface of the roller body 16 by mixing the alumina particles 95, the joining portion 80 is covered by the alumina particles 95, so that a groove caused by the joining portion 80 is not formed in the transport roller 15. Therefore, the groove caused by the joining portion 80 disappears, so that uneven transportation caused by the groove is prevented. Accordingly, the paper can be fed (transported) with accuracy and stability.

In addition, the alumina particles 95 are used of which the particle diameter distribution (particle size range) includes the particles 95a, smaller than the distance d1 on the outer peripheral surface side and larger than the distance d2 (10 μm) on the inner peripheral surface side of the joining portion 80. Therefore, the particles 95a enter the gap which is formed in the joining portion 80 so as to remain therein, so that the groove caused by the joining portion 80 is surely not formed. In addition, even though a force is applied to the roller body 16 (transport roller 15) in a direction to narrow the gap when it is operating, the alumina particles 95a, which enter the gap, stand against the force, so that the deformation of the roller body 16 (transport roller 15) is suppressed. Therefore, the transport roller 15 is prevented from uneven transportation which is caused by the deformation.

Furthermore, the particle diameter distribution of the alumina particles 95 is suitably used of which a minimum particle diameter is adjusted to be larger than the shortest distance between the pair of the end surfaces 61*a* and 61*b* of the joining portion 80, that is, the distance d2 on the inner peripheral surface side thereof. When the alumina particles 95 are mixed so as to form the high friction layer 50 on the surface of the roller body 16, the alumina particles 95 do not pass through the gap formed in the joining portion 80 so as not to enter the roller body 16. Therefore, subsequently, a process for cleaning the inside of the roller body 16 is alleviated, so that productivity can be improved by that much.

In addition, the transport roller 15 according to the embodiment is selectively provided with the high friction layer 50 on the center portion excepting both ends of the roller body 16, that is, the center portion coming into direct contact with the paper P (recording medium). Therefore, the transportation performance of the paper P is not degraded, and the cost of the material for the high friction layer 50 can be reduced to a minimum. In this case, the transport roller according to the invention is not limited thereto, but the high friction layer 50 may be formed over the entire length of the roller body 16.

In addition, the transport unit according to the embodiment is provided with the transport roller 15 which can be reduced in cost and weight and favorably exhibit a good transportation force, and in which uneven transportation caused by the joining portion of the roller body 16 is prevented. Therefore, the transport unit 16 itself can be reduced in cost and weight, and furthermore the transportability of the recording medium by the transport roller is also excellent.

In addition, since the ink jet printer (printing apparatus) 1 according to the embodiment is provided with the transport unit, the cost and the weight can be reduced, and furthermore the ink jet printer is excellent in transporting the recording medium.

Further, the invention is not limited to the above-mentioned embodiments, but various changes can be made without departing the scope of the invention.

For example, in the above-mentioned embodiments, the transport roller according to the invention is applied to the transport roller 15 of the transport roller mechanism 19. However, the transport roller can be applied to the paper discharge roller 29 or to the paper discharge GIZA roller 31 of the paper discharge roller mechanism 27, and furthermore also can be applied to the driven roller 17 (roller 17*a*) of the transport roller mechanism 19.

What is claimed is:

1. A transport roller comprising:
   a roller body that includes a cylindrical shaft having a joint between end surfaces of a rolled plate defining the cylindrical shaft, the joint extending between one axial end of the cylindrical shaft and an opposite axial end of the cylindrical shaft; and
   a high friction layer which contains inorganic particles therein and is provided on a surface of the cylindrical shaft in a rotation direction of the roller, wherein a portion of the inorganic particles protrude from the surface in a transportation area on which a medium is transported, and
   wherein the joint has a gap that is covered with inorganic particles in the transportation area,
   wherein the cylindrical shaft comprises an outer peripheral surface and an inner peripheral surface, wherein a gap distance between end surfaces at the outer peripheral surface is larger than a gap distance between end surfaces at the inner peripheral surface,
   wherein a highest position of the inorganic particles on the surface of the cylindrical shaft in the transportation area is substantially the same as a highest position of the inorganic particles covering the gap of the outer surface in the transportation area and
   wherein a part of the at least some inorganic particles straddle across the distance between the pair of the end surfaces in the joining portion.

2. The transport roller according to claim 1,
   wherein the high friction layer is formed by dispersing the inorganic particles in resin.

3. The transport roller according to claim 1,
   wherein the high friction layer is provided on a center portion of the roller body excepting both axial ends of the roller body.

4. A transport unit comprising the transport roller according to claim 1.

5. The transport unit according to claim 4, further comprising:
   a driven roller which is driven as the transport roller is rotated,
   wherein a low-abrasion treatment is implemented on a surface of the driven roller.

6. The transport unit according to claim 5,
   wherein the driven roller is disposed in a position coming into contact with the high friction layer of the transport roller.

7. A printing apparatus comprising:
   the transport roller according to claim 1, and
   a print unit which carries out a print process on a recording medium which is transported by the transport roller.

8. A transport roller comprising:
   a roller body that includes a cylindrical shaft having a joint between end surfaces of a rolled plate defining the cylindrical shaft, the joint extending between one axial end of the cylindrical shaft and an opposite axial end of the cylindrical shaft; and
   a high friction layer which contains inorganic particles therein and is provided on a surface of the cylindrical shaft in a rotation direction of the roller, wherein a portion of the inorganic particles protrude from the surface in a transportation area on which a medium is transported, and
   wherein the joint has a gap that is covered with inorganic particles in the transportation area,
   wherein the cylindrical shaft comprises an outer peripheral surface and an inner peripheral surface, wherein a gap distance between end surfaces at the outer peripheral surface is larger than a gap distance between end surfaces at the inner peripheral surface,
   wherein a highest position of the inorganic particles on the surface of the cylindrical shaft in the transportation area is substantially the same as a highest position of the inorganic particles covering the gap of the outer surface in the transportation area, and
   wherein a minimum particle diameter of the at least some inorganic particles is larger than the shortest distance between the pair of the end surfaces of the joining portion.

9. The transport roller according to claim 8,
   wherein the high friction layer is formed by dispersing the inorganic particles in resin.

10. The transport roller according to claim 8,
wherein the high friction layer is provided on a center portion of the roller body excepting both axial ends of the roller body.

11. A transport unit comprising the transport roller according to claim 8.

12. The transport unit according to claim 8, further comprising:
a driven roller which is driven as the transport roller is rotated,
wherein a low-abrasion treatment is implemented on a surface of the driven roller.

13. A printing apparatus comprising:
the transport roller according to claim 8, and
a print unit which carries out a print process on a recording medium which is transported by the transport roller.

14. A transport roller comprising:
a roller body that includes a cylindrical shaft having a joint between end surfaces of a rolled plate defining the cylindrical shaft, the joint extending between one axial end of the cylindrical shaft and an opposite axial end of the cylindrical shaft; and
a high friction layer which contains inorganic particles therein and is provided on a surface of the cylindrical shaft in a rotation direction of the roller, wherein a portion of the inorganic particles protrude from the surface in a transportation area on which a medium is transported, and
wherein the joint has a gap that is covered with inorganic particles in the transportation area,
wherein the cylindrical shaft comprises an outer peripheral surface and an inner peripheral surface, wherein a gap distance between end surfaces at the outer peripheral surface is larger than a gap distance between end surfaces at the inner peripheral surface,
wherein a highest position of the inorganic particles on the surface of the cylindrical shaft in the transportation area is substantially the same as a highest position of the inorganic particles covering the gap of the outer surface in the transportation area, and
wherein the at least some of the inorganic particles include inorganic particles having a diameter larger than the gap distance between end surfaces at the outer peripheral surface so as to extend over the gap.

15. The transport roller according to claim 14,
wherein the high friction layer is formed by dispersing the inorganic particles in resin.

16. The transport roller according to claim 14,
wherein the high friction layer is provided on a center portion of the roller body excepting both axial ends of the roller body.

17. A transport unit comprising the transport roller according to claim 14.

18. The transport unit according to claim 17, further comprising:
a driven roller which is driven as the transport roller is rotated,
wherein a low-abrasion treatment is implemented on a surface of the driven roller.

19. The transport unit according to claim 14,
wherein the driven roller is disposed in a position coming into contact with the high friction layer of the transport roller.

20. A printing apparatus comprising:
the transport roller according to claim 14, and
a print unit which carries out a print process on a recording medium which is transported by the transport roller.

* * * * *